(12) United States Patent
Damera-Venkata et al.

(10) Patent No.: US 7,470,032 B2
(45) Date of Patent: Dec. 30, 2008

(54) PROJECTION OF OVERLAPPING AND TEMPORALLY OFFSET SUB-FRAMES ONTO A SURFACE

(75) Inventors: Niranjan Damera-Venkata, Mountain View, CA (US); Nelson Liang An Chang, San Jose, CA (US); Simon Widdowson, Dublin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 539 days.

(21) Appl. No.: 11/260,737

(22) Filed: Oct. 27, 2005

(65) Prior Publication Data

US 2007/0097334 A1 May 3, 2007

(51) Int. Cl.
*G03B 21/14* (2006.01)

(52) U.S. Cl. .............................. 353/94; 353/30; 345/1.3

(58) Field of Classification Search ................... 353/30, 353/94; 345/1.3, 2.2, 9; 348/742
See application file for complete search history.

(56) References Cited

U.S. PATENT DOCUMENTS

| | | | |
|---|---|---|---|
| 3,589,806 A | 6/1971 | Rak | |
| 4,373,784 A | 2/1983 | Nonomura et al. | |
| 4,662,746 A | 5/1987 | Hornbeck | |
| 4,811,003 A | 3/1989 | Strathman et al. | |
| 4,956,619 A | 9/1990 | Hornbeck | |
| 5,061,049 A | 10/1991 | Hornbeck | |
| 5,083,857 A | 1/1992 | Hornbeck | |
| 5,146,356 A | 9/1992 | Carlson | |
| 5,309,241 A | 5/1994 | Hoagland | |
| 5,317,409 A | 5/1994 | Macocs | |
| 5,386,253 A | 1/1995 | Fielding | |
| 5,402,009 A | 3/1995 | Kiyota | |
| 5,402,184 A | 3/1995 | O'Grady et al. | |
| 5,490,009 A | 2/1996 | Venkateswar et al. | |
| 5,557,353 A | 9/1996 | Stahl | |
| 5,680,454 A | 10/1997 | Mead | |
| 5,689,283 A | 11/1997 | Shirochi | |
| 5,751,379 A | 5/1998 | Markandey et al. | |
| 5,842,762 A | 12/1998 | Clarke | |
| 5,897,191 A | 4/1999 | Clarke | |
| 5,912,773 A | 6/1999 | Barnett et al. | |

(Continued)

FOREIGN PATENT DOCUMENTS

EP          1 001 306 A2      5/2000

(Continued)

OTHER PUBLICATIONS

C. Jaynes et al., "Super-Resolution Composition in Multi-Projector Displays," IEEE Int'l Workshop on Projector-Camera Systems, Oct. 2003; 8 pgs.

(Continued)

*Primary Examiner*—William C. Dowling

(57) ABSTRACT

A method of displaying images with a display system includes receiving image data for the images. The method includes generating at least a first sub-frame and at least a second sub-frame corresponding to the image data. The first sub-frame is projected with a first projector onto a target surface. The second sub-frame is projected with a second projector onto the target surface at a temporal offset from the projection of the first sub-frame, wherein the first and second projectors are positioned to project sub-frames that spatially overlap on the target surface.

29 Claims, 9 Drawing Sheets

U.S. PATENT DOCUMENTS

| | | |
|---|---|---|
| 5,920,365 A | 7/1999 | Eriksson |
| 5,978,518 A | 11/1999 | Oliyide et al. |
| 6,025,951 A | 2/2000 | Swart et al. |
| 6,067,143 A | 5/2000 | Tomita |
| 6,104,375 A | 8/2000 | Lam |
| 6,118,584 A | 9/2000 | Van Berkel et al. |
| 6,141,039 A | 10/2000 | Poetsch |
| 6,184,969 B1 | 2/2001 | Fergason |
| 6,219,017 B1 | 4/2001 | Shimada et al. |
| 6,239,783 B1 | 5/2001 | Hill et al. |
| 6,243,055 B1 | 6/2001 | Fergason |
| 6,317,171 B1 | 11/2001 | Dewald |
| 6,384,816 B1 | 5/2002 | Tabata |
| 6,390,050 B2 | 5/2002 | Feikus |
| 6,393,145 B2 | 5/2002 | Betrisey et al. |
| 6,522,356 B1 | 2/2003 | Watanabe |
| 6,553,168 B2* | 4/2003 | Saccomanno ............... 385/116 |
| 6,657,603 B1 | 12/2003 | Demetrescu et al. |
| 6,674,561 B2 | 1/2004 | Ohnishi et al. |
| 6,829,664 B2 | 12/2004 | Nomizo et al. |
| 6,932,481 B2 | 8/2005 | Koyama et al. |
| 7,404,644 B2* | 7/2008 | Evans et al. ................... 353/31 |
| 7,407,295 B2* | 8/2008 | Damera-Venkata et al. ... 353/94 |
| 2003/0020809 A1 | 1/2003 | Gibbon et al. |
| 2003/0076325 A1 | 4/2003 | Thrasher |
| 2004/0033051 A1 | 2/2004 | Ip |
| 2004/0207815 A1* | 10/2004 | Allen et al. ................... 353/31 |
| 2004/0239885 A1 | 12/2004 | Jaynes et al. |
| 2006/0221304 A1* | 10/2006 | Damera-Venkata et al. ... 353/30 |
| 2007/0024824 A1* | 2/2007 | Damera-Venkata et al. ... 353/94 |
| 2007/0052934 A1* | 3/2007 | Widdowson et al. .......... 353/94 |
| 2007/0091277 A1* | 4/2007 | Damera-Venkata et al. ... 353/69 |

FOREIGN PATENT DOCUMENTS

| | | |
|---|---|---|
| WO | WO 01/33846 A2 | 5/2001 |
| WO | WO 2004/095200 A2 | 4/2004 |

OTHER PUBLICATIONS

L.M. Chen & S. Hasagawa, "Visual Resolution Limits for Color Matrix Displays—One Panel Projectors," vol. 13, pp. 221-226; 1992.

A. Yasuda et al., "FLC Wobbling for High-Resolution Projectors," Journal of the SID, pp. 229-305; May 1997.

T. Tokita et al., "P-108: FLC Resolution Enhancing Device for Projection Displays," pp. 229-305; SID 02 Digest 2002.

D.K. Kelley, "Motion and Vision—II. Stabilized Spatio-Temporal Threshold Surface," Journal of the Optical Society of America, vol. 69, No. 10; Oct. 1979.

Candice H. Brown Elliott et al., "Color Subpixel REndering Projectors and Flat Panel Displays," SMPTE Advanced Motion Imaging Conference; pp. 1-4; Feb. 27-Mar. 1, 2003.

Diana C. Chen, "Diplay Resolution Enhancement with Optical Scanners," Applied Optics, vol. 40, No. 5, pp. 636-643; Feb. 10, 2001.

E. Stupp et al., "Projection Displays," SID Series in Display Technology, Wiley; 1999.

John Borland web article, "HP Preps Pirate-Fighting Projector", http://www.news.com.

Cinea webpage "Making Privacy History", http://www.cinea.com.

Glenn L. Williams, NASA research document, "Sub-Nyquist Distortions in Sampled Data Waveform Recording, and Video Imaging", 20 pgs.

* cited by examiner

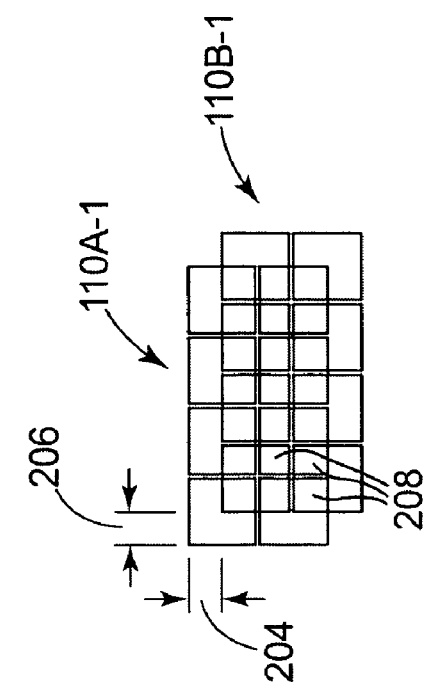
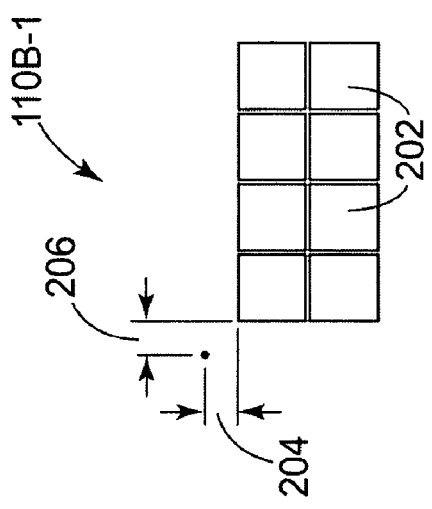
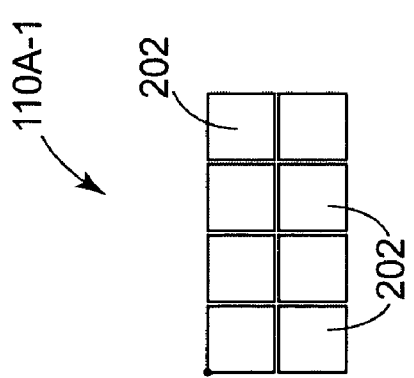
Fig. 2C
Fig. 2B
Fig. 2A

PROJECTION OF OVERLAPPING AND TEMPORALLY OFFSET SUB-FRAMES ONTO A SURFACE

CROSS-REFERENCE TO RELATED APPLICATION

This application is related to U.S. patent application Ser. No. 11/080,223, filed Mar. 15, 2005, and entitled PROJECTION OF OVERLAPPING SINGLE COLOR SUB-FRAMES ONTO A SURFACE and U.S. patent application Ser. No. 11/080,583, filed Mar. 15, 2005, and entitled PROJECTION OF OVERLAPPING SUB-FRAMES ONTO A SURFACE, both of which are hereby incorporated by reference herein.

BACKGROUND

Two types of projection display systems are digital light processor (DLP) systems, and liquid crystal display (LCD) systems. It is desirable in some projection applications to provide a high lumen level output, but it is very costly to provide such output levels in existing DLP and LCD projection systems. Three choices exist for applications where high lumen levels are desired: (1) high-output projectors; (2) tiled, low-output projectors; and (3) superimposed, low-output projectors.

When information requirements are modest, a single high-output projector is typically employed. This approach dominates digital cinema today, and the images typically have a nice appearance. High-output projectors have the lowest lumen value (i.e., lumens per dollar). The lumen value of high output projectors is less than half of that found in low-end projectors. If the high output projector fails, the screen goes black. Also, parts and service are available for high output projectors only via a specialized niche market.

Tiled projection can deliver very high resolution, but it is difficult to hide the seams separating tiles, and output is often reduced to produce uniform tiles. Tiled projection can deliver the most pixels of information. For applications where large pixel counts are desired, such as command and control, tiled projection is a common choice. Registration, color, and brightness must be carefully controlled in tiled projection. Matching color and brightness is accomplished by attenuating output, which costs lumens. If a single projector fails in a tiled projection system, the composite image is ruined.

Superimposed projection provides excellent fault tolerance and full brightness utilization, but resolution is typically compromised. Algorithms that seek to enhance resolution by offsetting multiple projection elements have been previously proposed. These methods assume simple shift offsets between projectors, use frequency domain analyses, and rely on heuristic methods to compute component sub-frames. The proposed systems do not generate optimal sub-frames in real-time, and do not take into account arbitrary relative geometric distortion between the component projectors.

Existing projection systems do not provide a cost effective solution for high lumen level (e.g., greater than about 10,000 lumens) applications. Existing projection systems also have a problem with projecting rich video and graphics content in real-time. The processing that is needed for delivering very good image quality and realistic graphics renderings is computationally intensive, and usually cannot keep up with real-time (e.g., video) frame rates. For this reason, such processing is typically replaced with much simpler algorithms that significantly compromise the quality of the rendered output.

Another problem with some existing projection systems, such as those used in many movie theaters, is that the systems do little or nothing to prevent illegal copying of the projected images. For example, a camcorder can be used in a movie theater to illegally record the projected images, and copies of the illegally recorded movie can then be sold to the public. Techniques have been proposed to help prevent such illegal copying, but many of these techniques adversely affect the quality of the projected images when viewed in the theater, and suffer from other disadvantages.

SUMMARY

One form of the present invention provides a method of displaying images with a display system. The method includes receiving image data for the images, and generating at least a first sub-frame and at least a second sub-frame corresponding to the image data. The first sub-frame is projected with a first projector onto a target surface. The second sub-frame is projected with a second projector onto the target surface at a temporal offset from the projection of the first sub-frame, wherein the first and second projectors are positioned to project sub-frames that spatially overlap on the target surface.

BRIEF DESCRIPTION OF THE DRAWINGS

FIGS. 2A-2C are schematic diagrams illustrating the projection of two sub-frames according to one embodiment of the present invention.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," etc., may be used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1:
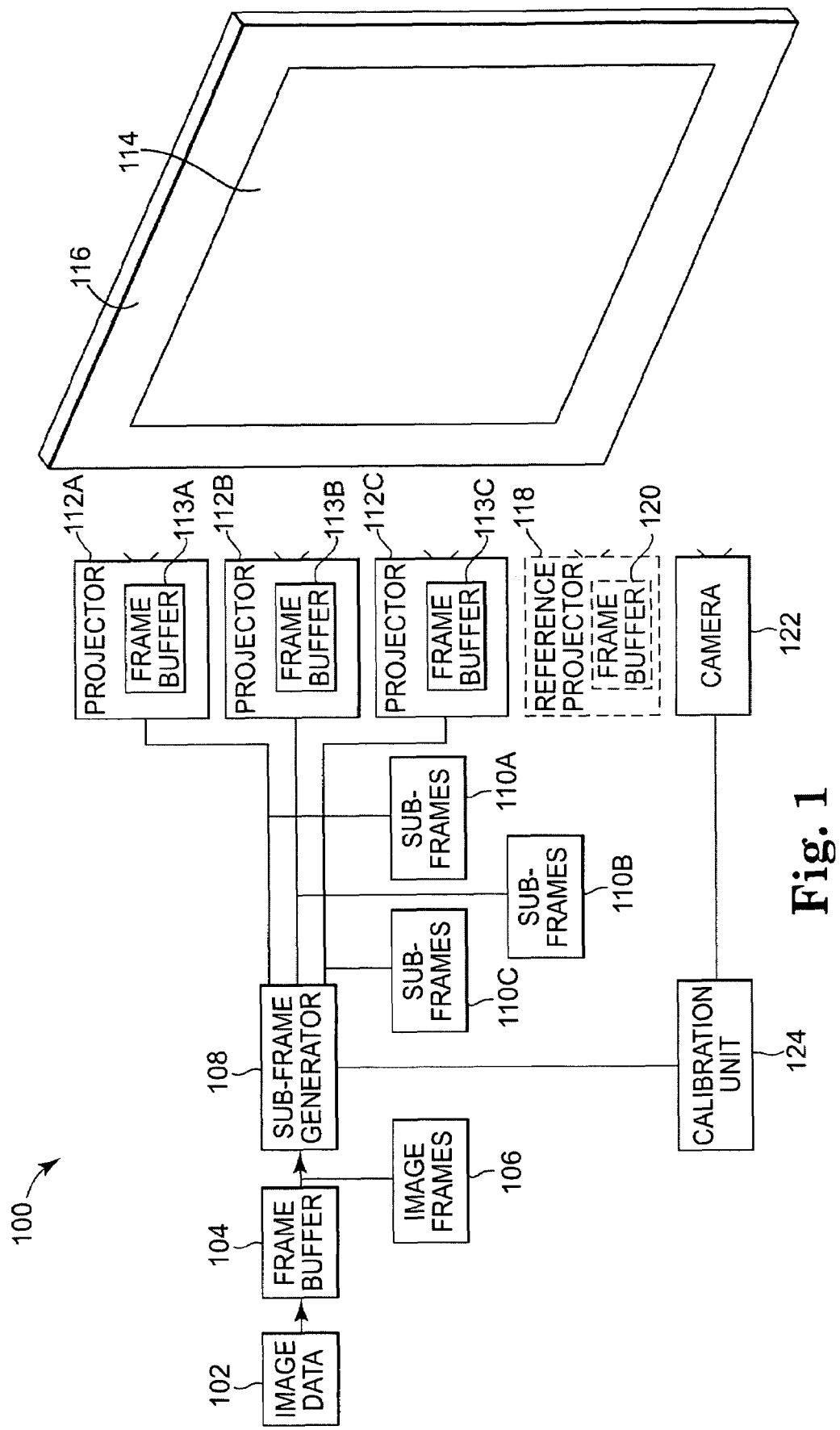
FIG. 1 is a block diagram illustrating an image display system according to one embodiment of the present invention.

FIG. 1 is a block diagram illustrating an image display system 100 according to one embodiment of the present invention. Image display system 100 processes image data 102 and generates a corresponding displayed image 114. Displayed image 114 is defined to include any pictorial, graphical, or textural characters, symbols, illustrations, or other representations of information.

In one embodiment, image display system 100 includes image frame buffer 104, sub-frame generator 108, projectors 112A-112C (collectively referred to as projectors 112), camera 122, and calibration unit 124. Image frame buffer 104 receives and buffers image data 102 to create image frames 106. Sub-frame generator 108 processes image frames 106 to define corresponding image sub-frames 110A-110C (collectively referred to as sub-frames 110). In one embodiment, for each image frame 106, sub-frame generator 108 generates one sub-frame 110A for projector 112A, one sub-frame 110B for projector 112B, and one sub-frame 110C for projector 112C. The sub-frames 110A-110C are received by projectors 112A-112C, respectively, and stored in image frame buffers 113A-113C (collectively referred to as image frame buffers 113), respectively. Projectors 112A-112C project the sub-frames 110A-110C, respectively, onto target surface 116 to produce displayed image 114 for viewing by a user.

Image frame buffer 104 includes memory for storing image data 102 for one or more image frames 106. Thus, image frame buffer 104 constitutes a database of one or more image frames 106. Image frame buffers 113 also include memory for storing sub-frames 110. Examples of image frame buffers 104 and 113 include non-volatile memory (e.g., a hard disk drive or other persistent storage device) and may include volatile memory (e.g., random access memory (RAM)).

Sub-frame generator 108 receives and processes image frames 106 to define a plurality of image sub-frames 110. Sub-frame generator 108 generates sub-frames 110 based on image data in image frames 106. In one embodiment, sub-frame generator 108 generates image sub-frames 110 with a resolution that matches the resolution of projectors 112, which is less than the resolution of image frames 106 in one embodiment. Sub-frames 110 each include a plurality of columns and a plurality of rows of individual pixels representing a subset of an image frame 106.

Projectors 112 receive image sub-frames 110 from sub-frame generator 108 and, in one embodiment, simultaneously project the image sub-frames 110 onto target 116 at overlapping and spatially offset positions to produce displayed image 114. In one embodiment, display system 100 is configured to give the appearance to the human eye of high-resolution displayed images 114 by displaying overlapping and spatially shifted lower-resolution sub-frames 110 from multiple projectors 112. In one form of the invention, the projection of overlapping and spatially shifted sub-frames 110 gives the appearance of enhanced resolution (i.e., higher resolution than the sub-frames 110 themselves).

A problem of sub-frame generation, which is addressed by embodiments of the present invention, is to determine appropriate values for the sub-frames 110 so that the displayed image 114 produced by the projected sub-frames 110 is close in appearance to how the high-resolution image (e.g., image frame 106) from which the sub-frames 110 were derived would appear if displayed directly.

It will be understood by a person of ordinary skill in the art that functions performed by sub-frame generator 108 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory, and random access memory.

Also shown in FIG. 1 is reference projector 118 with an image frame buffer 120. Reference projector 118 is shown with hidden lines in FIG. 1 because in one embodiment, projector 118 is not an actual projector, but rather is a hypothetical high-resolution reference projector that is used in an image formation model for generating optimal sub-frames 110, as described in further detail below with reference to FIGS. 2A-2C and 3. In one embodiment, the location of one of the actual projectors 112 is defined to be the location of the reference projector 118.

In one embodiment, display system 100 includes a camera 122 and a calibration unit 124, which are used in one form of the invention to automatically determine a geometric mapping between each projector 112 and the reference projector 118, as described in further detail below with reference to FIGS. 2A-2C and 3.

In one form of the invention, image display system 100 includes hardware, software, firmware, or a combination of these. In one embodiment, one or more components of image display system 100 are included in a computer, computer server, or other microprocessor-based system capable of performing a sequence of logic operations. In addition, processing can be distributed throughout the system with individual portions being implemented in separate system components, such as in a networked or multiple computing unit environment.

In one embodiment, display system 100 uses two projectors 112. FIGS. 2A-2C are schematic diagrams illustrating the projection of two sub-frames 110 according to one embodiment of the present invention. As illustrated in FIGS. 2A and 2B, sub-frame generator 108 defines two image sub-frames 110 for each of the image frames 106. More specifically, sub-frame generator 108 defines a first sub-frame 110A-1 and a second sub-frame 110B-1 for an image frame 106. As such, first sub-frame 110A-1 and second sub-frame 110B-1 each include a plurality of columns and a plurality of rows of individual pixels 202 of image data.

In one embodiment, as illustrated in FIG. 2B, when projected onto target 116, second sub-frame 110B-1 is offset from first sub-frame 110A-1 by a vertical distance 204 and a horizontal distance 206. As such, second sub-frame 110B-1 is spatially offset from first sub-frame 110A-1 by a predetermined distance. In one illustrative embodiment, vertical distance 204 and horizontal distance 206 are each approximately one-half of one pixel.

As illustrated in FIG. 2C, a first one of the projectors 112A projects first sub-frame 110A-1 in a first position and a second one of the projectors 112B projects second sub-frame 100B-1 in a second position, spatially offset from the first position. More specifically, the display of second sub-frame 110B-1 is spatially shifted relative to the display of first sub-frame 110A-1 by vertical distance 204 and horizontal distance 206. As such, pixels of first sub-frame 110A-1 overlap pixels of second sub-frame 110B-1, thereby producing the appearance of higher resolution pixels 208. The overlapped sub-frames 110A-1 and 110B-1 also produce a brighter overall image 114 than either of the sub-frames 110 alone. In other embodiments, more than two projectors 112 are used in system 100, and more than two sub-frames 110 are defined for each image frame 106, which results in a further increase in the resolution and brightness of the displayed image 114.

It will be understood by persons of ordinary skill in the art that the sub-frames 110 projected onto target 116 may have perspective distortions, and the pixels may not appear as perfect squares with no variation in the offsets and overlaps from pixel to pixel, such as that shown in FIGS. 2A-2C. Rather, in one form of the invention, the pixels of sub-frames 110 take the form of distorted quadrilaterals or other some other shape, and the overlaps may vary as a function of position. Thus, terms such as "spatially shifted" and "spatially offset positions" as used herein are not limited to a particular pixel shape or fixed offsets and overlaps from pixel to pixel, but rather are intended to include any arbitrary pixel shape, and offsets and overlaps that may vary from pixel to pixel.

In one form of the invention, sub-frames 110 have a lower resolution than image frames 106. Thus, sub-frames 110 are also referred to herein as low-resolution images or sub-frames 110, and image frames 106 are also referred to herein as high-resolution images or frames 106. It will be understood by persons of ordinary skill in the art that the terms low resolution and high resolution are used herein in a comparative fashion, and are not limited to any particular minimum or maximum number of pixels.

In one form of the invention, display system 100 produces a superimposed projected output that takes advantage of natural pixel mis-registration to provide a displayed image 114 with a higher resolution than the individual sub-frames 110. In one embodiment, image formation due to multiple overlapped projectors 112 is modeled using a signal processing model. Optimal sub-frames 110 for each of the component projectors 112 are estimated by sub-frame generator 108 based on the model, such that the resulting image predicted by the signal processing model is as close as possible to the desired high-resolution image to be projected.

In one embodiment, sub-frame generator 108 is configured to generate sub-frames 110 based on the maximization of a probability that, given a desired high resolution image, a simulated high-resolution image that is a function of the sub-frame values, is the same as the given, desired high-resolution image. If the generated sub-frames 110 are optimal, the simulated high-resolution image will be as close as possible to the desired high-resolution image. The generation of optimal sub-frames 110 based on a simulated high-resolution image and a desired high-resolution image is described in further detail below with reference to FIG. 3.

Figure 3:
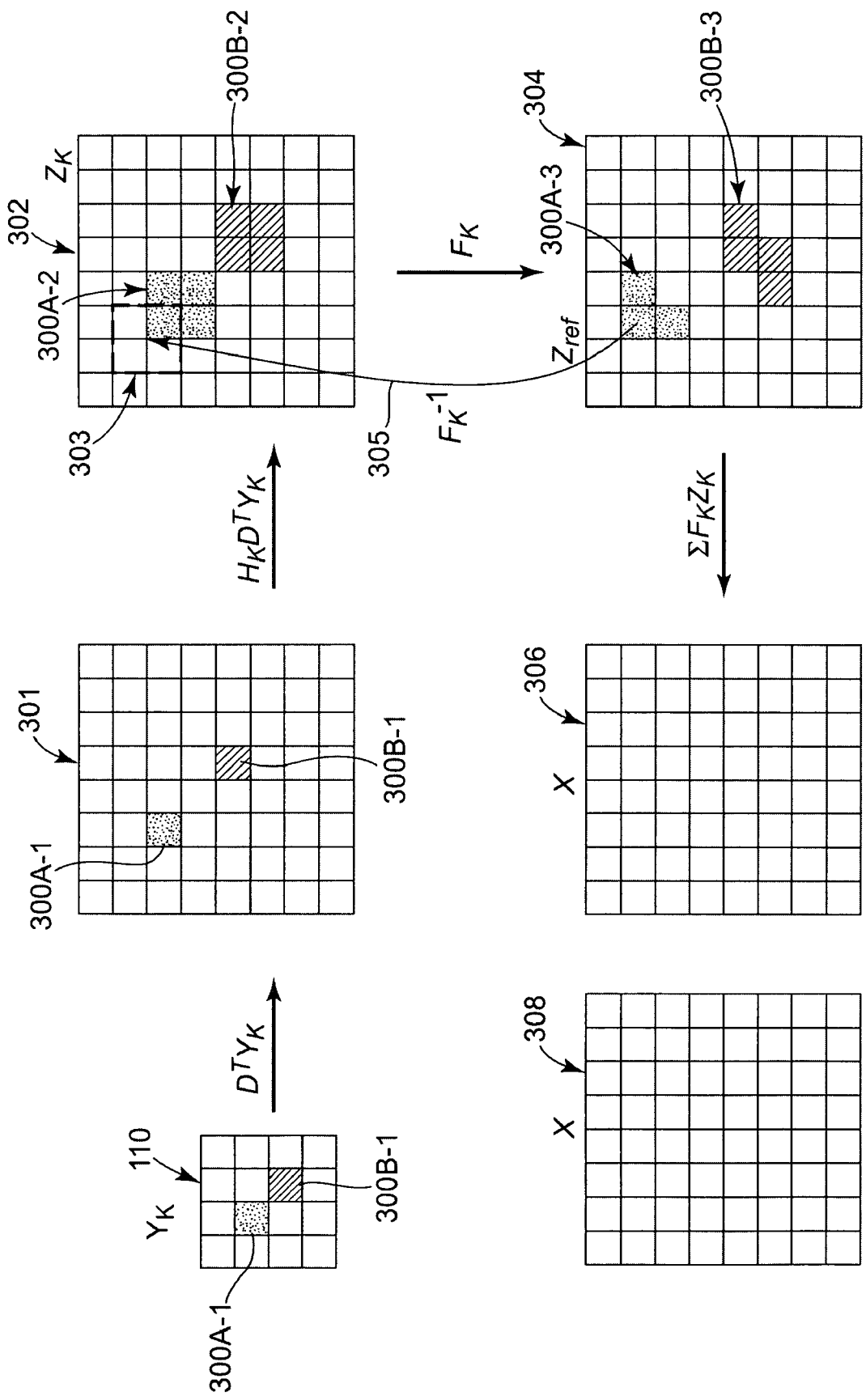
FIG. 3 is a diagram illustrating a model of an image formation process according to one embodiment of the present invention.

FIG. 3 is a diagram illustrating a model of an image formation process according to one embodiment of the present invention. The sub-frames 110 are represented in the model by $Y_k$, where "k" is an index for identifying the individual projectors 112. Thus, $Y_1$, for example, corresponds to a sub-frame 110A for a first projector 112A, $Y_2$ corresponds to a sub-frame 110B for a second projector 112B, etc. Two of the sixteen pixels of the sub-frame 110 shown in FIG. 3 are highlighted, and identified by reference numbers 300A-1 and 300B-1. The sub-frames 110 ($Y_k$) are represented on a hypothetical high-resolution grid by up-sampling (represented by $D^T$) to create up-sampled image 301. The up-sampled image 301 is filtered with an interpolating filter (represented by $H_k$) to create a high-resolution image 302 ($Z_k$) with "chunky pixels". This relationship is expressed in the following Equation I:

$$Z_k = H_k D^T Y_k \qquad \text{Equation I}$$

where:

k=index for identifying the projectors 112;

$Z_k$=low-resolution sub-frame 110 of the kth projector 112 on a hypothetical high-resolution grid;

$H_k$=Interpolating filter for low-resolution sub-frame 110 from kth projector 112;

$D^T$=up-sampling matrix; and $Y_k$=low-resolution sub-frame 110 of the kth projector 112.

The low-resolution sub-frame pixel data ($Y_k$) is expanded with the up-sampling matrix ($D^T$) so that the sub-frames 110 ($Y_k$) can be represented on a high-resolution grid. The interpolating filter ($H_k$) fills in the missing pixel data produced by up-sampling. In the embodiment shown in FIG. 3, pixel 300A-1 from the original sub-frame 110 ($Y_k$) corresponds to four pixels 300A-2 in the high-resolution image 302 ($Z_k$), and pixel 300B-1 from the original sub-frame 110 ($Y_k$) corresponds to four pixels 300B-2 in the high-resolution image 302 ($Z_k$). The resulting image 302 ($Z_k$) in Equation I models the output of the $k^{th}$ projector 112 if there was no relative distortion or noise in the projection process. Relative geometric distortion between the projected component sub-frames 110 results due to the different optical paths and locations of the component projectors 112. A geometric transformation is modeled with the operator, $F_k$, which maps coordinates in the frame buffer 113 of the $k^{th}$ projector 112 to the frame buffer 120 of the reference projector 118 (FIG. 1) with sub-pixel accuracy, to generate a warped image 304 ($Z_{ref}$). In one form of the invention, the transformation, $F_k$, is a coordinate mapping such as a translational shift, affine transformation, projective warp, or a more general non-linear transformation.

In one embodiment, $F_k$ is linear with respect to pixel intensities, but is non-linear with respect to the coordinate transformations. As shown in FIG. 3, the four pixels 300A-2 in image 302 are mapped to the three pixels 300A-3 in image 304, and the four pixels 300B-2 in image 302 are mapped to the four pixels 300B-3 in image 304.

In one embodiment, the geometric mapping ($F_k$) is a floating-point mapping, but the destinations in the mapping are on an integer grid in image 304. Thus, it is possible for multiple pixels in image 302 to be mapped to the same pixel location in image 304, resulting in missing pixels in image 304. To avoid this situation, in one form of the present invention, during the forward mapping ($F_k$), the inverse mapping ($F_k^{-1}$) is also utilized as indicated at 305 in FIG. 3. Each destination pixel in image 304 is back projected (i.e., $F_k^{-1}$) to find the corresponding location in image 302. For the embodiment shown in FIG. 3, the location in image 302 corresponding to the upper-left pixel of the pixels 300A-3 in image 304 is the location at the upper-left corner of the group of pixels 300A-2. In one form of the invention, the values for the pixels neighboring the identified location in image 302 are combined (e.g., averaged) to form the value for the corresponding pixel in image 304. Thus, for the example shown in FIG. 3, the value for the upper-left pixel in the group of pixels 300A-3 in image 304 is determined by averaging the values for the four pixels within the frame 303 in image 302.

In another embodiment of the invention, the forward geometric mapping or warp ($F_k$) is implemented directly, and the inverse mapping ($F_k^{-1}$) is not used. In one form of this embodiment, a scatter operation is performed to eliminate missing pixels. That is, when a pixel in image 302 is mapped to a floating point location in image 304, some of the image data for the pixel is essentially scattered to multiple pixels neighboring the floating point location in image 304. Thus, each pixel in image 304 may receive contributions from multiple pixels in image 302, and each pixel in image 304 is normalized based on the number of contributions it receives.

A superposition/summation of such warped images 304 from all of the component projectors 112 forms a hypothetical or simulated high-resolution image 306 (X-hat) in the reference projector frame buffer 120, as represented in the following Equation II:

$$\hat{X} = \sum_k F_k Z_k \qquad \text{Equation II}$$

where:
- k=index for identifying the projectors 112;
- X-hat=hypothetical or simulated high-resolution image 306 in the reference projector frame buffer 120;
- $F_k$=operator that maps a low-resolution sub-frame 110 of the kth projector 112 on a hypothetical high-resolution grid to the reference projector frame buffer 120; and
- $Z_k$=low-resolution sub-frame 110 of kth projector 112 on a hypothetical high-resolution grid, as defined in Equation I.

If the simulated high-resolution image 306 (X-hat) in the reference projector frame buffer 120 is identical to a given (desired) high-resolution image 308 (X), the system of component low-resolution projectors 112 would be equivalent to a hypothetical high-resolution projector placed at the same location as the reference projector 118 and sharing its optical path. In one embodiment, the desired high-resolution images 308 are the high-resolution image frames 106 (FIG. 1) received by sub-frame generator 108.

In one embodiment, the deviation of the simulated high-resolution image 306 (X-hat) from the desired high-resolution image 308 (X) is modeled as shown in the following Equation III:

$$X = \hat{X} + \eta \qquad \text{Equation III}$$

where:
- X=desired high-resolution frame 308;
- X-hat=hypothetical or simulated high-resolution frame 306 in the reference projector frame buffer 120; and
- $\eta$=error or noise term.

As shown in Equation III, the desired high-resolution image 308 (X) is defined as the simulated high-resolution image 306 (X-hat) plus $\eta$, which in one embodiment represents zero mean white Gaussian noise.

The solution for the optimal sub-frame data ($Y_k^*$) for the sub-frames 110 is formulated as the optimization given in the following Equation IV:

$$Y_k^* = \underset{Y_k}{\operatorname{argmax}} P(\hat{X}|X) \qquad \text{Equation IV}$$

where:
- k=index for identifying the projectors 112;
- $Y_k^*$=optimum low-resolution sub-frame 110 of the kth projector 112;
- $Y_k$=low-resolution sub-frame 110 of the kth projector 112;
- X-hat=hypothetical or simulated high-resolution frame 306 in the reference projector frame buffer 120, as defined in Equation II;
- X=desired high-resolution frame 308; and
- P(X-hat|X)=probability of X-hat given X.

Thus, as indicated by Equation IV, the goal of the optimization is to determine the sub-frame values ($Y_k$) that maximize the probability of X-hat given X. Given a desired high-resolution image 308 (X) to be projected, sub-frame generator 108 (FIG. 1) determines the component sub-frames 110 that maximize the probability that the simulated high-resolution image 306 (X-hat) is the same as or matches the "true" high-resolution image 308 (X).

Using Bayes rule, the probability P(X-hat|X) in Equation IV can be written as shown in the following Equation V:

$$P(\hat{X}|X) = \frac{P(X|\hat{X})P(\hat{X})}{P(X)} \qquad \text{Equation V}$$

where:
- X-hat=hypothetical or simulated high-resolution frame 306 in the reference projector frame buffer 120, as defined in Equation II;
- X=desired high-resolution frame 308;
- P(X-hat|X)=probability of X-hat given X;
- P(X|X-hat)=probability of X given X-hat;
- P(X-hat)=prior probability of X-hat; and
- P(X)=prior probability of X.

The term P(X) in Equation V is a known constant. If X-hat is given, then, referring to Equation III, X depends only on the noise term, $\eta$, which is Gaussian. Thus, the term P(X|X-hat) in Equation V will have a Gaussian form as shown in the following Equation VI:

$$P(X|\hat{X}) = \frac{1}{C} e^{-\frac{\|X-\hat{X}\|^2}{2\sigma^2}} \qquad \text{Equation VI}$$

where:
- X-hat=hypothetical or simulated high-resolution frame 306 in the reference projector frame buffer 120, as defined in Equation II;
- X=desired high-resolution frame 308;
- P(X|X-hat)=probability of X given X-hat;
- C=normalization constant; and
- $\sigma$=variance of the noise term, $\eta$.

To provide a solution that is robust to minor calibration errors and noise, a "smoothness" requirement is imposed on X-hat. In other words, it is assumed that good simulated images 306 have certain properties. The smoothness requirement according to one embodiment is expressed in terms of a desired Gaussian prior probability distribution for X-hat given by the following Equation VII:

$$P(\hat{X}) = \frac{1}{Z(\beta)} e^{-\{\beta^2(\|\nabla \hat{X}\|^2)\}} \qquad \text{Equation VII}$$

where:
- P(X-hat)=prior probability of X-hat;
- β=smoothing constant;
- Z(β)=normalization function;
- ∇=gradient operator; and
- X-hat=hypothetical or simulated high-resolution frame 306 in the reference projector frame buffer 120, as defined in Equation II.

In another embodiment of the invention, the smoothness requirement is based on a prior Laplacian model, and is expressed in terms of a probability distribution for X-hat given by the following Equation VIII:

$$P(\hat{X}) = \frac{1}{Z(\beta)} e^{-\{\beta(\|\nabla \hat{X}\|)\}} \qquad \text{Equation VIII}$$

where:
- P(X-hat)=prior probability of X-hat;
- β=smoothing constant;
- Z(β)=normalization function;
- ∇=gradient operator; and
- X-hat=hypothetical or simulated high-resolution frame 306 in the reference projector frame buffer 120, as defined in Equation II.

The following discussion assumes that the probability distribution given in Equation VII, rather than Equation VIII, is being used. As will be understood by persons of ordinary skill in the art, a similar procedure would be followed if Equation VIII were used. Inserting the probability distributions from Equations VI and VII into Equation V, and inserting the result into Equation IV, results in a maximization problem involving the product of two probability distributions (note that the probability P(X) is a known constant and goes away in the calculation). By taking the negative logarithm, the exponents go away, the product of the two probability distributions becomes a sum of two probability distributions, and the maximization problem given in Equation IV is transformed into a function minimization problem, as shown in the following Equation IX:

$$Y_k^* = \underset{Y_k}{\operatorname{argmin}} \|X - \hat{X}\|^2 + \beta^2 \|\nabla \hat{X}\|^2 \qquad \text{Equation IX}$$

where:
- k=index for identifying the projectors 112;
- $Y_k^*$=optimum low-resolution sub-frame 110 of the kth projector 112;
- $Y_k$=low-resolution sub-frame 110 of the kth projector 112;
- X-hat=hypothetical or simulated high-resolution frame 306 in the reference projector frame buffer 120, as defined in Equation II;
- X=desired high-resolution frame 308;
- β=smoothing constant; and
- ∇=gradient operator.

The function minimization problem given in Equation IX is solved by substituting the definition of X-hat from Equation II into Equation IX and taking the derivative with respect to $Y_k$, which results in an iterative algorithm given by the following Equation X:

$$Y_k^{(n+1)} = Y_k^{(n)} - \Theta\{DH_k^T F_k^T[(\hat{X}^{(n)} - X) + \beta^2 \nabla^2 \hat{X}^{(n)}]\} \qquad \text{Equation X}$$

where:
- k=index for identifying the projectors 112;
- n=index for identifying iterations;
- $Y_k^{(n+1)}$=low-resolution sub-frame 110 for the kth projector 112 for iteration number n+1;
- $Y_k^{(n)}$=low-resolution sub-frame 110 for the kth projector 112 for iteration number n;
- Θ=momentum parameter indicating the fraction of error to be incorporated at each iteration;
- D=down-sampling matrix;
- $H_k^T$=Transpose of interpolating filter, $H_k$, from Equation I (in the image domain, $H_k^T$ is a flipped version of $H_k$);
- $F_k^T$=Transpose of operator, $F_k$, from Equation II (in the image domain, $F_k^T$ is the inverse of the warp denoted by $F_k$);
- $\hat{X}^{(n)}$=hypothetical or simulated high-resolution frame 306 in the reference projector frame buffer 120, as defined in Equation II, for iteration number n;
- X=desired high-resolution frame 308;
- β=smoothing constant; and
- $\nabla^2$=Laplacian operator.

Equation X may be intuitively understood as an iterative process of computing an error in the reference projector 118 coordinate system and projecting it back onto the sub-frame data. In one embodiment, sub-frame generator 108 (FIG. 1) is configured to generate sub-frames 110 in real-time using Equation X. The generated sub-frames 110 are optimal in one embodiment because they maximize the probability that the simulated high-resolution image 306 (X-hat) is the same as the desired high-resolution image 308 (X), and they minimize the error between the simulated high-resolution image 306 and the desired high-resolution image 308. Equation X can be implemented very efficiently with conventional image processing operations (e.g., transformations, down-sampling, and filtering). The iterative algorithm given by Equation X converges rapidly in a few iterations and is very efficient in terms of memory and computation (e.g., a single iteration uses two rows in memory; and multiple iterations may also be rolled into a single step). The iterative algorithm given by Equation X is suitable for real-time implementation, and may be used to generate optimal sub-frames 110 at video rates, for example.

To begin the iterative algorithm defined in Equation X, an initial guess, $Y_k^{(0)}$, for the sub-frames 110 is determined. In one embodiment, the initial guess for the sub-frames 110 is determined by texture mapping the desired high-resolution frame 308 onto the sub-frames 110. In one form of the invention, the initial guess is determined from the following Equation XI:

$$Y_k^{(0)} = DB_k F_k^T X \qquad \text{Equation XI}$$

where:
- k=index for identifying the projectors 112;
- $Y_k^{(0)}$=initial guess at the sub-frame data for the sub-frame 110 for the kth projector 112;
- D=down-sampling matrix;
- $B_k$=interpolation filter;
- $F_k^T$=Transpose of operator, $F_k$, from Equation II (in the image domain, $F_k^T$ is the inverse of the warp denoted by $F_k$); and
- X=desired high-resolution frame 308.

Thus, as indicated by Equation XI, the initial guess ($Y_k^{(0)}$) is determined by performing a geometric transformation ($F_k^T$) on the desired high-resolution frame 308 (X), and filtering ($B_k$) and down-sampling (D) the result. The particular combination of neighboring pixels from the desired high-resolution frame 308 that are used in generating the initial guess ($Y_k^{(0)}$) will depend on the selected filter kernel for the interpolation filter ($B_k$).

In another form of the invention, the initial guess, $Y_k^{(0)}$, for the sub-frames 110 is determined from the following Equation XII $$Y_k^{(0)} = DF_k^T X \quad \text{Equation XII}$$

where:
- k=index for identifying the projectors 112;
- $Y_k^{(0)}$=initial guess at the sub-frame data for the sub-frame 110 for the kth projector 112;
- D=down-sampling matrix;
- $F_k^T$=Transpose of operator, $F_k$, from Equation II (in the image domain, $F_k^T$ is the inverse of the warp denoted by $F_k$); and
- X=desired high-resolution frame 308.

Equation XII is the same as Equation XI, except that the interpolation filter ($B_k$) is not used.

Several techniques are available to determine the geometric mapping ($F_k$) between each projector 112 and the reference projector 118, including manually establishing the mappings, or using camera 122 and calibration unit 124 (FIG. 1) to automatically determine the mappings. Techniques for determining geometric mappings that are suitable for use in one form of the present invention are described in U.S. patent application Ser. No. 10/356,858, filed Feb. 3, 2003, entitled "MULTIFRAME CORRESPONDENCE ESTIMATION", and U.S. patent application Ser. No. 11/068,195, filed Feb. 28, 2005, entitled "MULTI-PROJECTOR GEOMETRIC CALIBRATION", both of which are hereby incorporated by reference herein.

In one embodiment, if camera 122 and calibration unit 124 are used, the geometric mappings between each projector 112 and the camera 122 are determined by calibration unit 124. These projector-to-camera mappings may be denoted by $T_k$, where k is an index for identifying projectors 112. Based on the projector-to-camera mappings ($T_k$), the geometric mappings ($F_k$) between each projector 112 and the reference projector 118 are determined by calibration unit 124, and provided to sub-frame generator 108. For example, in a display system 100 with two projectors 112A and 112B, assuming the first projector 112A is the reference projector 118, the geometric mapping of the second projector 112B to the first (reference) projector 112A can be determined as shown in the following Equation XIII:

$$F_2 = T_2 T_1^{-1} \quad \text{Equation XIII}$$

where:
- $F_2$=operator that maps a low-resolution sub-frame 110 of the second projector 112B to the first (reference) projector 112A;
- $T_1$=geometric mapping between the first projector 112A and the camera 122; and
- $T_2$=geometric mapping between the second projector 112B and the camera 122.

In one embodiment, the geometric mappings ($F_k$) are determined once by calibration unit 124, and provided to sub-frame generator 108. In another embodiment, calibration unit 124 continually determines (e.g., once per frame 106) the geometric mappings ($F_k$), and continually provides updated values for the mappings to sub-frame generator 108.

As described above in the Background section, existing projection systems have a problem with projecting rich video and graphics content in real-time due to the computationally intensive processing. Graphics cards and graphics hardware/video pipelines in existing projection systems are unable to deliver realistic, high-quality rendering in real-time. One form of the present invention overcomes this problem by using a system 100 of multiple overlapped projectors 112 (i.e., multiple projectors 112 with overlapping display areas), and temporally staggering the projection of each projector 112, or each set of projectors 112, so that each projector may operate at a significantly lower frame rate than the overall frame rate of the system 100.

For example, in a system 100 with two temporally-staggered projectors 112, with each projector 112 operating at 30 frames per second, the overall frame rate of the system 100 according to one embodiment is 60 frames per second. In a system 100 with four temporally-staggered projectors 112, with each projector 112 operating at 30 frames per second, the overall frame rate of the system 100 according to one embodiment is 120 frames per second. In one embodiment, the "frame rate" of a projector 112 refers to the rate at which sub-frames 110 are projected by that projector 112. Because the individual projectors 112 are operated at a lower frame rate, more time is available for the computationally intensive processing typically used in delivering rich video and graphics content. This staggered or temporally offset projection is described in further detail below with reference to FIGS. 4 and 5A-5E.

Figure 4:
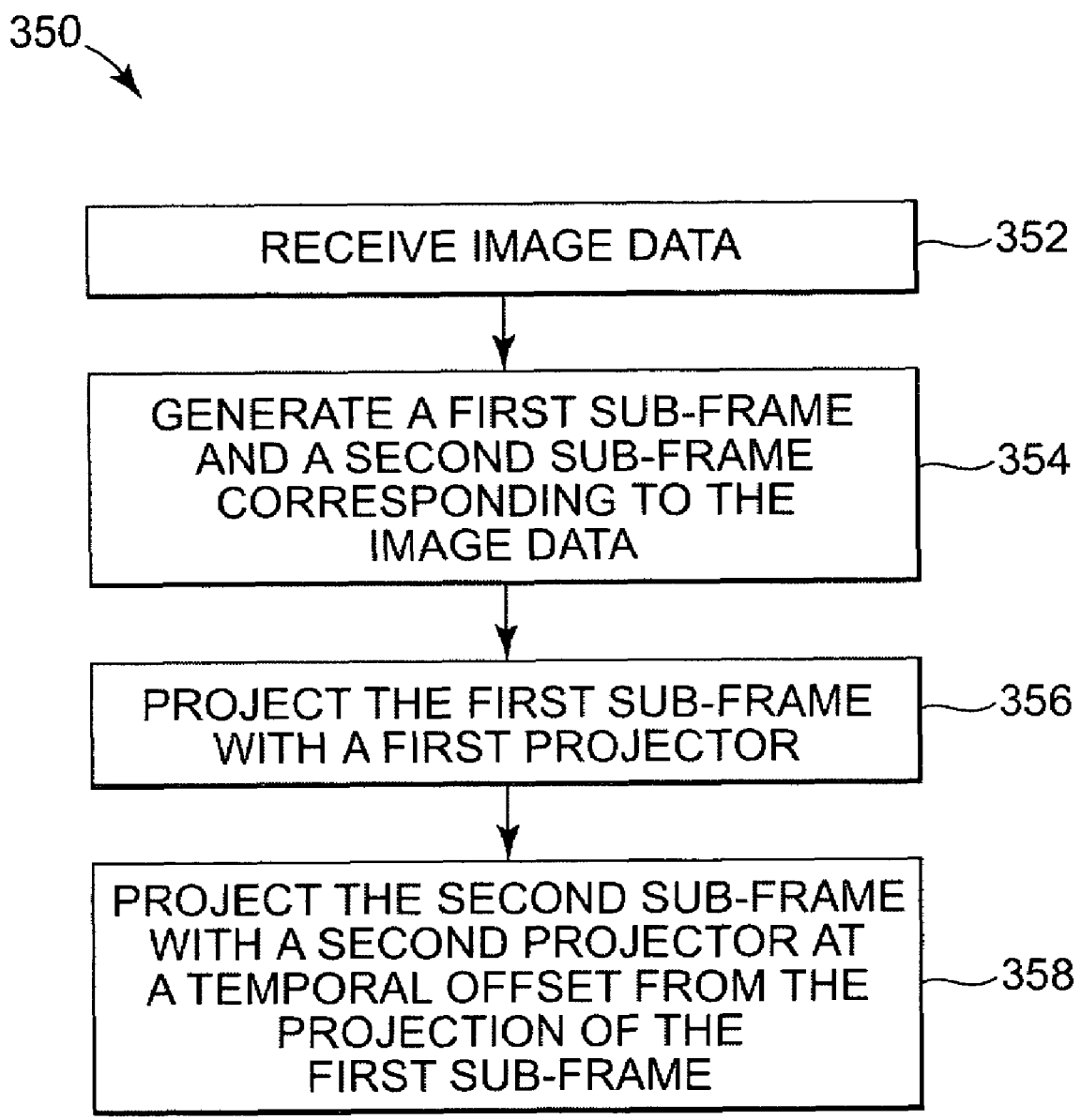
FIG. 4 is a flow diagram illustrating a method of displaying images with a display system according to one embodiment of the present invention.

FIG. 4 is a flow diagram illustrating a method 350 of displaying images with display system 100 (FIG. 1) according to one embodiment of the present invention. At 352, frame buffer 104 receives image data 102. At 354, sub-frame generator 108 generates a first sub-frame 110A and a second sub-frame 110B corresponding to the image data 102. It should be noted that, in one embodiment, the first sub-frame 110A and the second sub-frame 110B are generated at 354 according to the techniques shown in FIG. 3 and described above, where initial guesses for the sub-frames are determined from the high resolution image data 102 (see, e.g., Equations XI and XII and corresponding description). The first sub-frame 110A and the second sub-frame 110B are then generated from the initial guesses using an iterative process (see, e.g., Equation X and corresponding description) that is based on the model shown in FIG. 3 and described above.

At 356, the first sub-frame 110A is projected with a first projector 112A onto target surface 116. At 358, the second sub-frame 110B is projected with a second projector 112B onto the target surface 116 at a temporal offset from the projection of the first sub-frame 110A, wherein the first projector 112A and the second projector 112B are positioned to project sub-frames 110 that spatially overlap on the target surface 116.

Figure 5A:
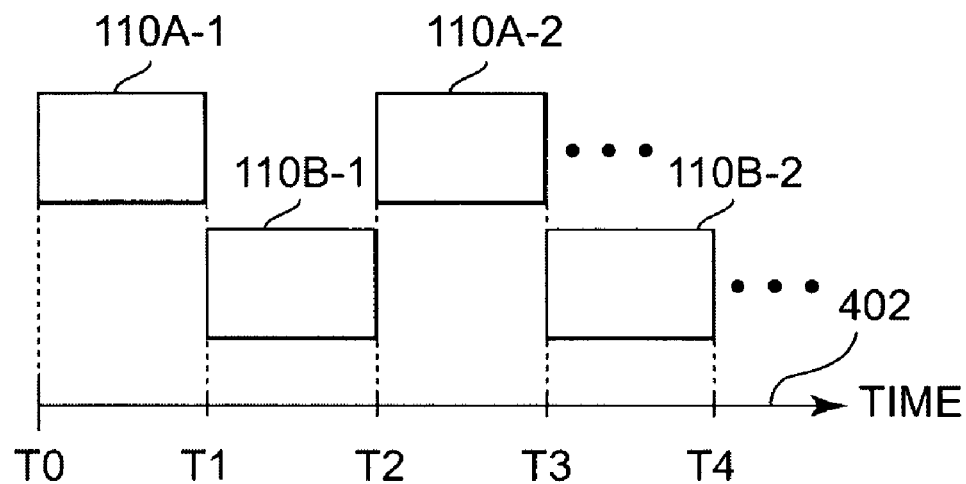
FIG. 5A is a diagram illustrating the temporally offset projection of sub-frames by two projectors in the display system shown in FIG. 1 according to one embodiment of the present invention.

FIG. 5A is a diagram illustrating the temporally offset projection of sub-frames by two projectors 112 in display system 100 according to one embodiment of the present invention. In the illustrated embodiment, sub-frames 110A-1 and 110A-2 represent sub-frames projected over time by a first projector 112, and sub-frames 110B-1 and 110B-2 represent sub-frames projected over time by a second projector 112. Time is represented in FIG. 5A by time axis 402.

As shown in FIG. 5A, the first projector 112 begins projecting sub-frame 110A-1 at time T0, and stops projecting sub-frame 110A-1 at time T1. The second projector 112 begins projecting sub-frame 110B-1 at time T1, and stops projecting sub-frame 110B-1 at time T2. The first projector 112 begins projecting sub-frame 110A-2 at time T2, and stops projecting sub-frame 110A-2 at time T3. The second projector 112 begins projecting sub-frame 110B-2 at time T3, and stops projecting sub-frame 110B-2 at time T4.

In the embodiment shown in FIG. 5A, sub-frames 110A-1 and 110A-2 are temporally offset from sub-frames 110B-1 and 110B-2, and there is no temporal overlap of the sub-frames. The temporal offset between sub-frame 110A-1 and 110B-1, for example, is T1 minus T0, which is the display time of an entire sub-frame in the illustrated embodiment. In one embodiment, the first projector 112 projects sub-frames 110A-1 and 110A-2 at a 30 frames per second rate, and the second projector 112 projects sub-frames 110B-1 and 110B-2 at a 30 frames per second rate, thereby achieving an effective frame rate of 60 frames per second for system 100. In other embodiments, individual projector frame rates that are greater or less than 30 frames per second are used.

One consequence of staggering the projection of sub-frames such that there is no temporal overlap, like that shown in FIG. 5A (and FIG. 5C), is that the brightness of the resulting image 114 (FIG. 1) is not as great as it would be with a temporal overlap. Examples that include a temporal overlap are shown in FIGS. 5B, 5D, and 5E, and described below.

Figure 5B:
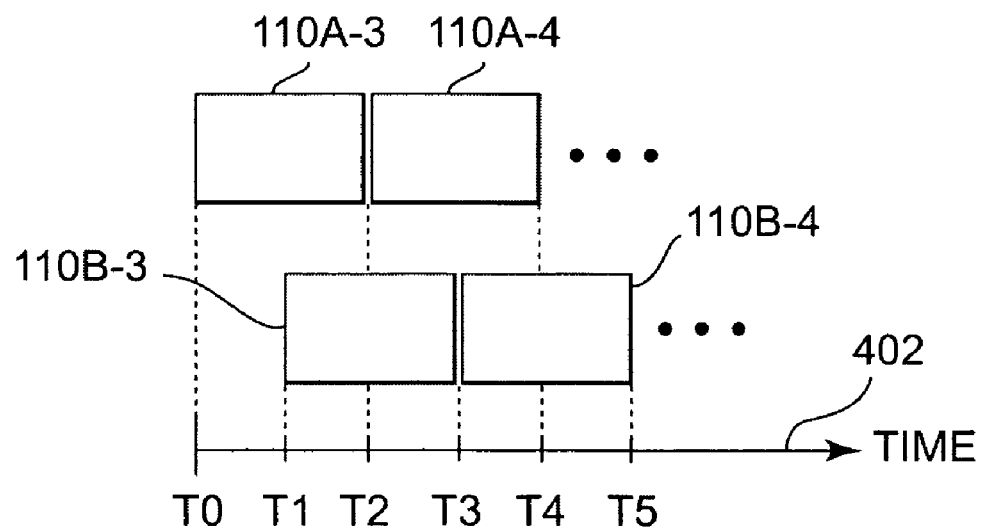
FIG. 5B is a diagram illustrating the temporally offset projection of sub-frames by two projectors in the display system shown in FIG. 1 according to another embodiment of the present invention.

FIG. 5B is a diagram illustrating the temporally offset projection of sub-frames by two projectors 112 in display system 100 according to another embodiment of the present invention. In the illustrated embodiment, sub-frames 110A-3 and 110A-4 represent sub-frames projected over time by a first projector 112, and sub-frames 100B-3 and 100B-4 represent sub-frames projected over time by a second projector 112.

As shown in FIG. 5B, the first projector 112 begins projecting sub-frame 110A-3 at time T0, and stops projecting sub-frame 110A-3 at time T2. The second projector 112 begins projecting sub-frame 110B-3 at time T1, and stops projecting sub-frame 100B-3 at time T3. The first projector 112 begins projecting sub-frame 110A-4 at time T2, and stops projecting sub-frame 110A-4 at time T4. The second projector 112 begins projecting sub-frame 110B-4 at time T3, and stops projecting sub-frame 110B-4 at time T5.

In the embodiment shown in FIG. 5B, sub-frames 110A-3 and 110A-4 are temporally offset from sub-frames 110B-3 and 110B-4, and there is temporal overlap of the sub-frames. The temporal offset between sub-frame 110A-3 and 110B-3, for example, is T1 minus T0, which is half of the display time of an entire sub-frame in the illustrated embodiment. In other embodiments, other temporal offsets may be used, such as a quarter or a third of the display time of an entire sub-frame. In one embodiment, the first projector 112 projects sub-frames 110A-3 and 110A-4 at a 30 frames per second rate, and the second projector 112 projects sub-frames 110B-3 and 110B-4 at a 30 frames per second rate, thereby achieving an effective frame rate of 60 frames per second for system 100. In other embodiments, individual projector frame rates that are greater or less than 30 frames per second are used.

Since there is a temporal overlap of the sub-frames in the embodiment shown in FIG. 5B (in addition to a spatial overlap), such as the temporal overlap of sub-frames 110A-3 and 110B-3 during the time between T1 and T2, the temporally-overlapping sub-frames both contribute to the resulting image 114 (FIG. 1) during this time period. In one form of the invention, sub-frame generator 108 takes this temporal overlap into account when generating optimal values for the sub-frames 110.

Figure 5C:
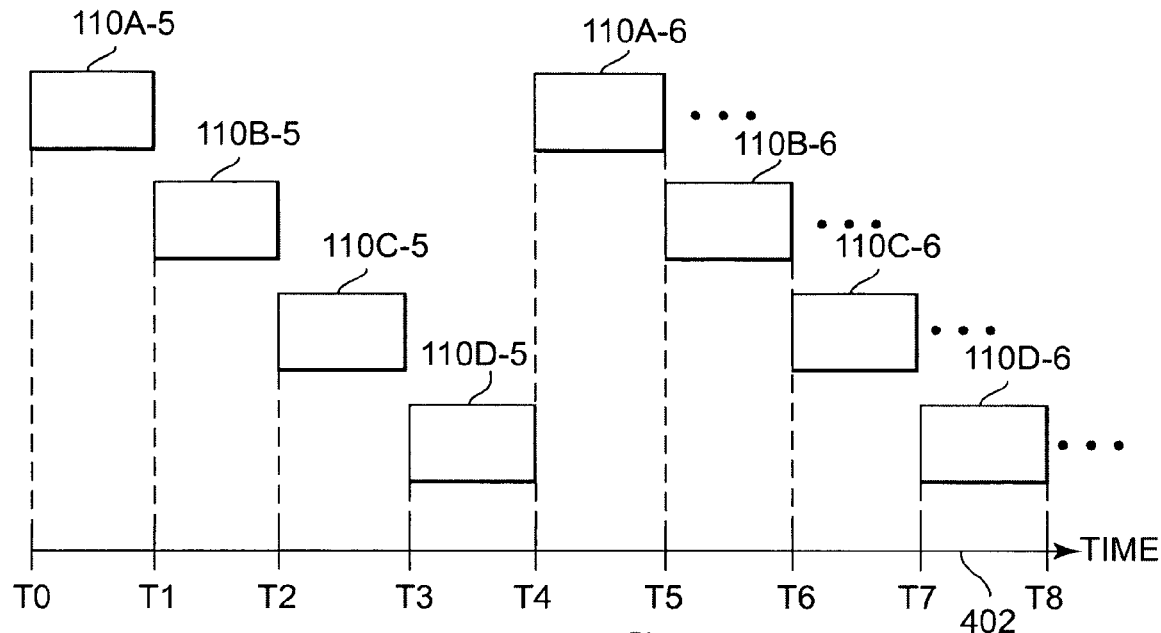
FIG. 5C is a diagram illustrating the temporally offset projection of sub-frames by four projectors in the display system shown in FIG. 1 according to a first embodiment of the present invention.
Figure 5D:
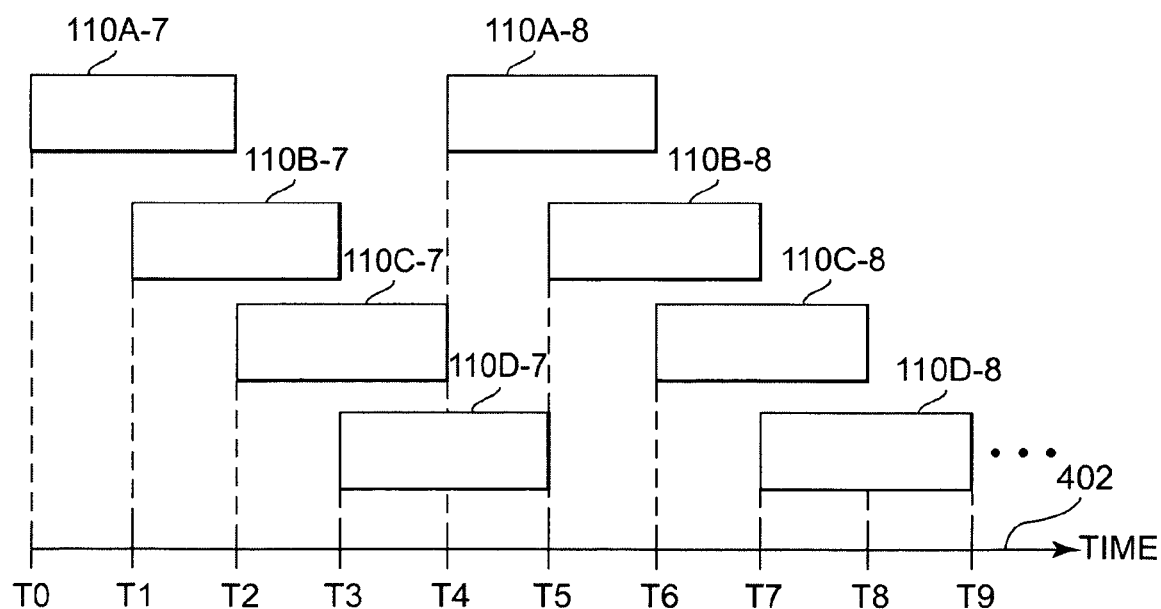
FIG. 5D is a diagram illustrating the temporally offset projection of sub-frames by four projectors in the display system shown in FIG. 1 according to a second embodiment of the present invention.
Figure 5E:
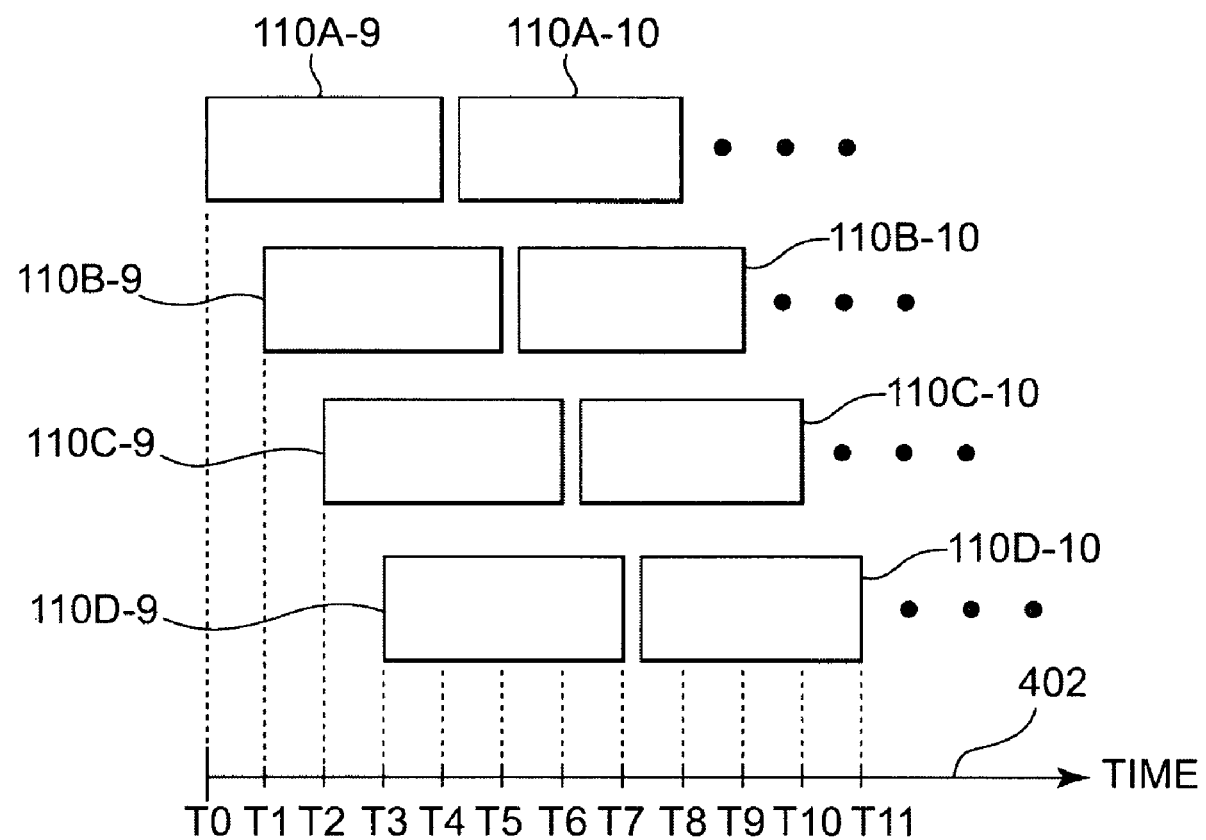
FIG. 5E is a diagram illustrating the temporally offset projection of sub-frames by four projectors in the display system shown in FIG. 1 according to a third embodiment of the present invention.

FIG. 5C is a diagram illustrating the temporally offset projection of sub-frames by four projectors 112 in display system 100 according to a first embodiment of the present invention. In the illustrated embodiment, sub-frames 110A-5 and 110A-6 represent sub-frames projected over time by a first projector 112, sub-frames 110B-5 and 110B-6 represent sub-frames projected over time by a second projector 112, sub-frames 110C-5 and 110C-6 represent sub-frames projected over time by a third projector 112, and sub-frames 110D-5 and 110D-6 represent sub-frames projected over time by a fourth projector 112.

As shown in FIG. 5C, the first projector 112 begins projecting sub-frame 110A-5 at time T0, and stops projecting sub-frame 110A-5 at time T1. The second projector 112 begins projecting sub-frame 110B-5 at time T1, and stops projecting sub-frame 110B-5 at time T2. The third projector 112 begins projecting sub-frame 110C-5 at time T2, and stops projecting sub-frame 110C-5 at time T3. The fourth projector 112 begins projecting sub-frame 110D-5 at time T3, and stops projecting sub-frame 110D-5 at time T4.

The first projector 112 begins projecting sub-frame 110A-6 at time T4, and stops projecting sub-frame 110A-6 at time T5. The second projector 112 begins projecting sub-frame 110B-6 at time T5, and stops projecting sub-frame 110B-6 at time T6. The third projector 112 begins projecting sub-frame 110C-6 at time T6, and stops projecting sub-frame 110C-6 at time T7. The fourth projector 112 begins projecting sub-frame 110D-6 at time T7, and stops projecting sub-frame 110D-6 at time T8.

In the embodiment shown in FIG. 5C, the sub-frames from the four projectors 112 are temporally offset from each other, and there is no temporal overlap of the sub-frames. The temporal offset between sub-frame 110A-5 and 110B-5, for example, is T1 minus T0, which is the display time of an entire sub-frame in the illustrated embodiment. In one embodiment, the first projector 112 projects sub-frames 110A-5 and 110A-6 at a 30 frames per second rate, the second projector 112 projects sub-frames 110B-5 and 110B-6 at a 30 frames per second rate, the third projector 112 projects sub-frames 110C-5 and 110C-6 at a 30 frames per second rate, and the fourth projector 112 projects sub-frames 110D-5 and 110D-6 at a 30 frames per second rate, thereby achieving an effective frame rate of 120 frames per second for system 100. In other embodiments, individual projector frame rates that are greater or less than 30 frames per second are used.

FIG. 5D is a diagram illustrating the temporally offset projection of sub-frames by four projectors 112 in display system 100 according to a second embodiment of the present invention. In the illustrated embodiment, sub-frames 110A-7 and 110A-8 represent sub-frames projected over time by a first projector 112, sub-frames 110B-7 and 110B-8 represent sub-frames projected over time by a second projector 112, sub-frames 110C-7 and 110C-8 represent sub-frames projected over time by a third projector 112, and sub-frames 110D-7 and 110D-8 represent sub-frames projected over time by a fourth projector 112.

As shown in FIG. 5D, the first projector 112 begins projecting sub-frame 110A-7 at time T0, and stops projecting sub-frame 110A-7 at time T2. The second projector 112 begins projecting sub-frame 110B-7 at time T1, and stops projecting sub-frame 110B-7 at time T3. The third projector 112 begins projecting sub-frame 110C-7 at time T2, and stops projecting sub-frame 110C-7 at time T4. The fourth projector 112 begins projecting sub-frame 110D-7 at time T3, and stops projecting sub-frame 110D-7 at time T5.

The first projector 112 begins projecting sub-frame 110A-8 at time T4, and stops projecting sub-frame 110A-8 at time T6. The second projector 112 begins projecting sub-frame 110B-8 at time T5, and stops projecting sub-frame 110B-8 at time T7. The third projector 112 begins projecting sub-frame 110C-8 at time T6, and stops projecting sub-frame 110C-8 at time T8. The fourth projector 112 begins projecting sub-frame 110D-8 at time T7, and stops projecting sub-frame 110D-8 at time T9.

In the embodiment shown in FIG. 5D, the sub-frames from the four projectors 112 are temporally offset from each other, and there is temporal overlap of the sub-frames. The temporal offset between sub-frame 110A-7 and 110B-7, for example, is T1 minus T0, which is half of the display time of an entire sub-frame in the illustrated embodiment. In other embodiments, other temporal offsets may be used. In one embodiment, the first projector 112 projects sub-frames 110A-7 and 110A-8 at a 30 frames per second rate, the second projector 112 projects sub-frames 110B-7 and 110B-8 at a 30 frames per second rate, the third projector 112 projects sub-frames 110C-7 and 110C-8 at a 30 frames per second rate, and the fourth projector 112 projects sub-frames 110D-7 and 110D-8 at a 30 frames per second rate, thereby achieving an effective frame rate of 120 frames per second for system 100. In other embodiments, individual projector frame rates that are greater or less than 30 frames per second are used.

Since there is a temporal overlap of the sub-frames in the embodiment shown in FIG. 5D (in addition to a spatial overlap), such as the temporal overlap of sub-frames 110A-7 and 110B-7 during the time between T1 and T2, the temporally-overlapping sub-frames both contribute to the resulting image 114 (FIG. 1) during this time period. In the embodiment shown in FIG. 5D, two sub-frames contribute to the image 114 during each time interval. In the embodiment shown in FIG. 5E and discussed below, four sub-frames contribute to the image 114 during each time interval. In one form of the invention, sub-frame generator 108 takes this temporal overlap of two or more sub-frames 110 into account when generating optimal values for the sub-frames 110.

FIG. 5E is a diagram illustrating the temporally offset projection of sub-frames by four projectors 112 in display system 100 according to a third embodiment of the present invention. In the illustrated embodiment, sub-frames 110A-9 and 110A-10 represent sub-frames projected over time by a first projector 112, sub-frames 110B-9 and 110B-10 represent sub-frames projected over time by a second projector 112, sub-frames 110C-9 and 110C-10 represent sub-frames projected over time by a third projector 112, and sub-frames 110D-9 and 110D-10 represent sub-frames projected over time by a fourth projector 112.

As shown in FIG. 5E, the first projector 112 begins projecting sub-frame 110A-9 at time T0, and stops projecting sub-frame 110A-9 at time T4. The second projector 112 begins projecting sub-frame 110B-9 at time T1, and stops projecting sub-frame 110B-9 at time T5. The third projector 112 begins projecting sub-frame 110C-9 at time T2, and stops projecting sub-frame 110C-9 at time T6. The fourth projector 112 begins projecting sub-frame 110D-9 at time T3, and stops projecting sub-frame 110D-9 at time T7.

The first projector 112 begins projecting sub-frame 110A-10 at time T4, and stops projecting sub-frame 110A-10 at time T8. The second projector 112 begins projecting sub-frame 110B-10 at time T5, and stops projecting sub-frame 110B-10 at time T9. The third projector 112 begins projecting sub-frame 110C-10 at time T6, and stops projecting sub-frame 110C-10 at time T1. The fourth projector 112 begins projecting sub-frame 110D-10 at time T7, and stops projecting sub-frame 110D-10 at time T11.

In the embodiment shown in FIG. 5E, the sub-frames from the four projectors 112 are temporally offset from each other, and there is temporal overlap of the sub-frames. The temporal offset between sub-frame 110A-9 and 110B-9, for example, is T1 minus T0, which is one quarter of the display time of an entire sub-frame in the illustrated embodiment. In other embodiments, other temporal offsets may be used. The embodiment shown in FIG. 5E will provide a brighter overall image than the embodiment shown in FIG. 5D, since at any given time, there will be four spatially-overlapping sub-frames being concurrently displayed for the embodiment shown in FIG. 5E, and there will be two spatially-overlapping sub-frames being concurrently displayed for the embodiment shown in FIG. 5D. In one embodiment, the first projector 112 projects sub-frames 110A-9 and 110A-10 at a 30 frames per second rate, the second projector 112 projects sub-frames 110B-9 and 110B-10 at a 30 frames per second rate, the third projector 112 projects sub-frames 110C-9 and 110C-10 at a 30 frames per second rate, and the fourth projector 112 projects sub-frames 110D-9 and 110D-10 at a 30 frames per second rate, thereby achieving an effective frame rate of 120 frames per second for system 100. In other embodiments, individual projector frame rates that are greater or less than 30 frames per second are used.

Since there is a temporal overlap of the sub-frames in the embodiment shown in FIG. 5E (in addition to a spatial overlap), such as the temporal overlap of sub-frames 110A-9, 110B-9, 110C-9, and 110D-9, during the time between T3 and T4, these temporally-overlapping sub-frames all contribute to the resulting image 114 (FIG. 1) during this time period. In one form of the invention, sub-frame generator 108 takes this temporal overlap into account when generating optimal values for the sub-frames 110.

In one embodiment, each of the sub-frames shown in FIGS. 5A-5E includes two sets of temporal sub-pixels. In this embodiment, each of the projectors 112 includes a color-wheel that completes two complete rotations during each frame time. The first set of sub-pixels is generated during the first rotation of the color-wheel, and the second set of sub-pixels is generated during the second rotation of the color-wheel. The human visual system tends to average the two sets of sub-pixels together. In one form of the invention, projectors 112 are delayed by one temporal sub-pixel amount. For example, in one embodiment, after a first one of the projectors 112 has completed its first color-wheel rotation (e.g., has gone through a first red-green-blue sequence) for a given sub-frame and is beginning a second color-wheel rotation, a second one of the projectors 112 is triggered and begins its first color-wheel rotation (e.g., begins its first sequence of red-green-blue). Thus, the first projector 112 projects its second set of temporal sub-pixels at the same time that the second projector 112 projects its first set of temporal sub-pixels.

In one embodiment, system 100 is configurable to include any desired number of projectors 112, operating at any desired frame rate, to provide any desired overall effective frame rate. In one form of the invention, the same image content is repeated in sets of successive sub-frames 110 to give the appearance of a lower frame rate system (e.g. 24 or 30 frames per second), even though the effective frame rate of the system 100 may be much higher (e.g., 60 or 120 frames per second). In one form of the invention, system 100 includes multiple banks of projectors 112, with a plurality of projectors 112 in each bank, and with the sub-frames 110 in a given bank being projected in synchronization with each other, but staggered in time from the sub-frames 110 projected from the other banks.

In one embodiment, system 100 includes a shuttering mechanism for temporally offsetting the projection of sub-frames 110. In another embodiment, display system 100 includes discrete micro-mirror device (DMD) arrays, and the temporal offset of sub-frames 110 is achieved by keeping all mirrors in a DMD array in an off position until a new sub-frame 110 is triggered. In another embodiment, system 100 includes hardware, such as graphics cards with frame lock or delay capabilities, to provide a desired delay in the projection of graphics content, or buffers at the inputs of the projectors 112 to delay projection and achieve a desired temporal staggering of the projected sub-frames 110. In yet another embodiment, rather than triggering the projectors 112 at some fixed delay, the temporal offset between projectors 112 is automatically detected by system 100, and the sub-frames 110 are generated (e.g., in real-time) based on the detected temporal offset.

The ability to provide any desired frame rate with multiple temporally offset projectors 112, as described above, is useful for many applications, including some security applications. For example, as described above in the Background section, one problem in the movie industry is the illegal recording of movies in a movie theater with a camcorder. One embodiment of the present invention helps prevent or limit such activities by varying over time the delay between the firing or triggering of the different projectors 112. For example, referring to FIG. 5A, the first sub-frame 110A-1 is triggered at time T0, and the second sub-frame 110B-1 is triggered at time T1. The delay between the triggering of these two sub-frames is T1 minus T0. Rather than using a constant delay between the triggering of each sub-frame 110, in one form of the invention, sub-frame generator 108 automatically varies the delay period over time, which causes synchronization problems for a camcorder.

Another form of the present invention combines temporally offset projection by a plurality of projectors 112, and dithering or modulation of sub-frames 110 to help prevent or limit illegal camcorder recordings. Dithering of sub-frames 110 according to one form of the invention is described below with reference to FIGS. 6A, 6B, and 7.

Figure 6B:
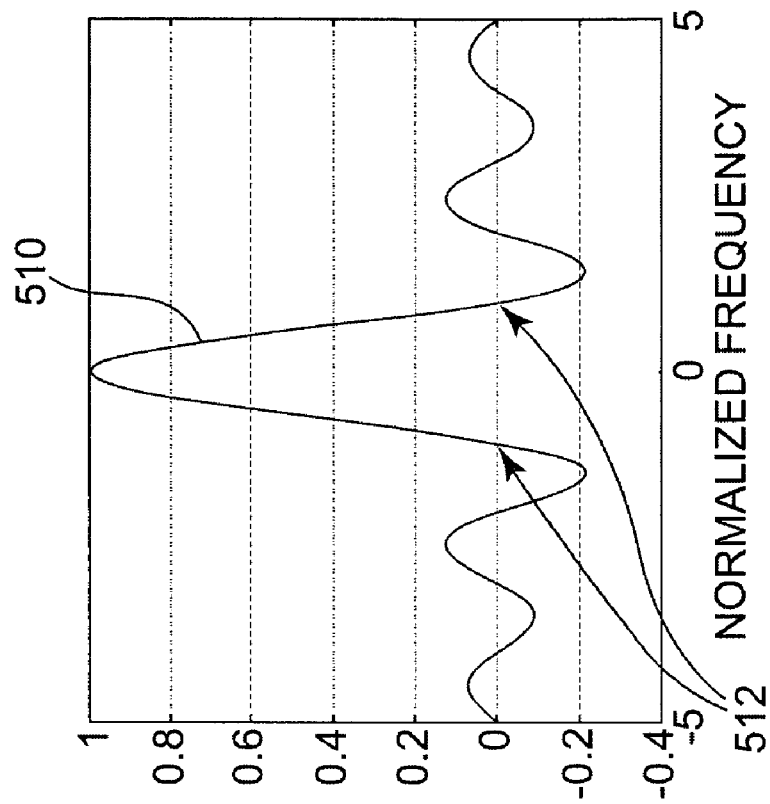
FIG. 6B is a diagram illustrating the frequency spectrum for the point spread function shown in FIG. 6A.
Figure 6A:
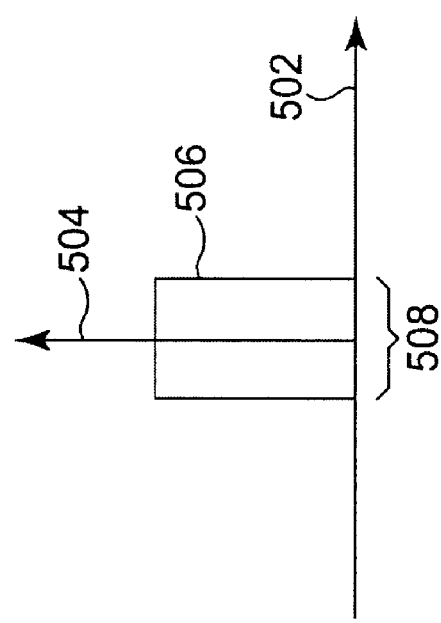
FIG. 6A is a diagram illustrating a function for modeling temporal integration by a camcorder according to one form of the invention.

FIG. 6A is a diagram illustrating a function for modeling temporal integration by a camcorder according to one form of the invention. In FIG. 6A, the horizontal axis 502 represents time, and the vertical axis 504 represents intensity. The rectangle-shaped function 506 in FIG. 6A is a temporal integration point spread function, and has a width 508 (in the time axis 502), which is assumed to be $1/60^{th}$ of a second. Camcorders typically use interlaced sampling at 60 Hz. For example, a camcorder may capture even rows of a frame in a first $1/60^{th}$ of a second, and then capture odd rows of a frame in a second $1/60^{th}$ of a second, and so on. In this manner, the camcorder captures full frames at 30 frames per second. Camcorders integrate temporally for an integration period or exposure time, and then the integrated signal is sampled.

FIG. 6B is a diagram illustrating the frequency spectrum 510 for the point spread function 506 shown in FIG. 6A. The horizontal axis in FIG. 6B represents normalized frequency, and the vertical axis represents normalized signal magnitude. The frequency spectrum 510 goes to zero at 60 cycles per second, which is identified in FIG. 6B at 512, as well as multiples of 60 cycles per second. As can be seen in FIG. 6B, signals that are close to 60 cycles per second will be allowed to pass through, but the camcorder will attenuate these signals. Because the camcorder is sampling at 60 Hz, if the signal being recorded by the camcorder includes temporal frequencies above 30 cycles per second, aliasing will result, and artifacts will appear in the captured images.

In one form of the present invention, sub-frame generator 108 (FIG. 1) is configured to introduce a pattern into the sub-frames 110 that the human eye is insensitive to, but that is visible in images captured by a camcorder. In one form of the invention, the pattern is introduced by modulating the sub-frames 110 at a frequency where visual sensitivity is very low, but that causes aliasing with the sampling of the camcorder. In one embodiment, system 100 modulates over time an image characteristic of generated sub-frames 110. In one embodiment, system 100 uses a high effective display frame rate so that the modulation does not cause distortions in the displayed sub-frames 110 (i.e., the modulation only causes distortions in the camcorder-sampled sub-frames 110). In one embodiment, the modulation preserves the mean gray level of the underlying signal to be projected.

In one embodiment, sub-frame generator 108 is configured to generate modulation values or dither values, d, for each sub-frame 110 based on the following Equation XIV:

$$d = A \sin(2\pi(f_{mod}/f_{disp})n + \theta) \quad \text{Equation XIV}$$

Where:
    d=dither or modulation value;
    A=amplitude;
    $f_{mod}$=modulation frequency;
    $f_{disp}$=display frequency (i.e., effective frame rate) of system 100;
    n=index for identifying sub-frames; and
    $\theta$=phase.

As used herein, the terms sine (or sin) and sinusoidal modulation are intended to include modulation based on a sine function, as well as modulation based on a cosine function. The sine function in Equation XIV is equivalent to a cosine function when the phase, $\theta$, is $\pi/2$. In one embodiment, sub-frame generator 108 is configured to generate dithered sub-frames 110 based on the following Equation XV:

$$X_{new} = X_{old} + d \quad \text{Equation XV}$$

Where:
    $X_{new}$=new sub-frame value;
    $X_{old}$=old sub-frame value; and
    d=dither value calculated from Equation XIV.

In one form of the invention, the "X" values in Equation XV are chrominance values of the sub-frames 110. In this embodiment, the chrominance values are sinusoidally modulated over time, without changing luminance values of the sub-frames 110 (i.e., maintaining the original luminance values of the sub-frames 110). In another embodiment, the "X" values in Equation XV are some other image characteristic, such as luminance values, or intensity values (e.g., red, green, and blue values). Human visual sensitivity to chrominance is less than for luminance. Human visual sensitivity to chrominance falls off much more rapidly with increasing frequency than for luminance. Thus, modulation of the chrominance values is less likely to produce noticeable differences to a viewer of the directly displayed sub-frames 110 than luminance modulation, but still produces aliasing effects (e.g., color artifacts) when captured by a camcorder. Because of the faster fall off of chrominance as compared to luminance, system 100 can use lower frame rates for chrominance modulation than for luminance modulation. The modulation of sub-frames 110 according to one form of the invention is mean-preserving (i.e., the mean of the image characteristic being modulated is not changed).

In one embodiment, the amplitude, A, in Equation XIV is a function of the old sub-frame value, $X_{old}$ (Equation XV), currently being operated on. In one form of the invention, the function is a percentage of the old sub-frame value (e.g., A=10% of $X_{old}$). In other embodiments, other functions may be used.

In one embodiment, the dithered sub-frames 110 generated by sub-frame generator 108 based on Equation XV produce one of three types of distortion in the camcorder images, which are referred to herein as type I distortion, type II distortion, and type III distortion. Even though these distortions adversely affect the camcorder images, there is no noticeable effect to a viewer of the projected sub-frames 110. Each of these types of distortion is described in further detail below.

Type I distortions are sampling distortions. For type I, frequencies above the Nyquist frequency of the camcorder (e.g., 30 cycles per second) are introduced into the captured images. Since temporal integration over the exposure time of the camcorder does not cut off all frequencies above the Nyquist frequency, aliasing occurs during sampling by the camcorder. If system 100 is configured to provide an effective frame rate of 60 frames per second, the maximum temporal frequency that can be provided by the system 100 is 30 cycles per second. A white sub-frame followed by a black sub-frame, for example, represents one cycle. Thus, an effective frame rate of 60 frames per second (30 cycles per second) would not cause aliasing in the camcorder sampling, because aliasing occurs above 30 cycles per, second. Thus, in one form of the invention, system, 100 is configured to provide an effective frame rate of greater than 60 frames per second (to produce more than 30 cycles per second), and thereby cause aliasing in the camcorder sampling, and type I distortions.

Assuming a camcorder sampling frequency of 60 Hz, the modulation frequency, $f_{mod}$, in Equation XIV is chosen in one embodiment to be greater than 30 Hz to alias with the camcorder sampling, and produce type I distortions. In one form of the invention, system 100 includes four projectors 112, which are each configured to operate at a frame rate of 30 frames per second, thereby providing an effective frame rate for the system 100 of 120 frames per second (i.e., the display frequency, $f_{disp}$, in Equation XIV equals 120). For a system 100 with an effective frame rate of 120 frames per second, the modulation frequency, $f_{mod}$, is chosen in one embodiment to be less than 60 Hz to avoid visible artifacts in the displayed images 114. Thus, the modulation frequency, $f_{mod}$, according to one form of the invention is in the range of between 30 Hz and 60 Hz. Some example values for producing type I distortions according to one embodiment are: a modulation frequency, $f_{mod}$, in Equation XIV of 45 Hz; an amplitude, A, of 0.3; an index, n, being consecutive integer values; and a phase, θ, of 0 or some other constant value. With a value of 0.3 for the amplitude, A, in Equation XIV, the dither values, d, will range from −0.3 to +0.3.

If the modulation frequency, $f_{mod}$, in Equation XIV is 45 Hz, the dithered sub-frames 110 generated based on Equation XV will alias with the camcorder sampling, and produce visible flicker (e.g., chrominance flicker) at 15 Hz in the camcorder images, but will not produce a noticeable difference to a viewer of the directly displayed sub-frames 110. Thus, this high-frequency modulation, which is not noticeable in the directly displayed sub-frames 110, appears at a lower (more visible) frequency in the images captured by the camcorder. This type I distortion is due to sampling of the camcorder, and cannot be removed even by ideal reconstruction (e.g., using an ideal box low-pass filter at the Nyquist frequency).

Type II distortions are caused by non-ideal reconstruction of the original signal by the camcorder. Type II distortions are due to the inability to implement the infinite sample reconstruction formula implied by the Nyquist sampling theorem. Type II distortions can occur at frequencies just below the camcorder Nyquist frequency (e.g., 30 cycles per second), and well below this Nyquist frequency. Type II distortions at frequencies just below the Nyquist frequency are produced in one form of the invention by using a modulation frequency, $f_{mod}$, in Equation XIV of slightly less than 30 Hz (i.e., slightly less than the assumed Nyquist frequency of a camcorder). In one embodiment, in order to produce type II distortions, the modulation frequency, $f_{mod}$, in Equation XIV is in the range of between 27-30 Hz. A first frequency near the Nyquist frequency is produced by using a modulation frequency, $f_{mod}$, in Equation XIV of slightly less than 30 Hz, and a second frequency near the Nyquist frequency (e.g., 30-33 Hz) occurs due to camcorder sampling and imperfect reconstruction. Superposition of these two frequencies results in low frequency envelope modulation (i.e., amplitude modulation).

Type II distortions can also occur at frequencies well below the Nyquist frequency. These distortions are caused in one form of the invention by using a modulation frequency, $f_{mod}$, that satisfies the conditions given in the following Equation XVI:

$$f_{mod} = (m/n) f_{samp} \qquad \text{Equation XVI}$$

Where:
  $f_{mod}$=modulation frequency in Equation XIV;
  m and n=relatively prime numbers, and where (m/n)≦(1/2); and
  $f_{samp}$=camcorder sampling frequency (e.g., 60 Hz).

The term "relatively prime" as used herein is intended to mean that the two numbers, m and n, have no common divisor other than "1".

Type III distortions according to one form of the invention are caused by using a modulation frequency, $f_{mod}$, at or near the camcorder Nyquist frequency, and performing phase modulation. At or near the Nyquist frequency, the phase modulation is converted into amplitude modulation. In one embodiment, a modulation frequency, $f_{mod}$, (in Equation XIV) at or near the Nyquist frequency (e.g., in the range of 27-30 Hz) is used, and the phase parameter, θ, is varied temporally or spatially, which causes type III distortions that appear as annoying patterns in the images captured by a camcorder.

In one embodiment, the modulation of sub-frames 110 based on Equation XV is performed with spatial uniformity. For example, in one embodiment, each pixel in a generated sub-frame 110 is modulated using the same modulation equation, with the same modulation parameter values (e.g., the same modulation frequency, $f_{mod}$, amplitude, A, and phase, θ, values). In another embodiment, the modulation of sub-frames 110 based on Equation XV is spatially varying, so that different modulation parameter values are used at different portions of a given sub-frame 110. For example, one portion of a generated sub-frame 110 may be modulated using a modulation frequency, $f_{mod}$, of 45 Hz, and another portion of the same sub-frame 110 may be modulated using a modulation frequency, $f_{mod}$, of 50 Hz. Similarly, the amplitude, A, and phase, θ, values of the modulation may be varied for different portions of a sub-frame 110. Spatially varying the modulation in this manner helps to make the images captured by a camcorder to be further objectionable. In one form of the invention, the spatially varying modulation is randomized, and modulation parameter values are randomly selected or generated to modulate various portions of a generated sub-frame 110. In one embodiment, one or more of the modulation parameters are functions of time, and are temporally varied.

In one form of the invention, sub-frame generator 108 is configured to embed information (e.g., which cinema a movie was being shown at, when the movie was shown, etc.) in the modulation using a known set of temporal modulation parameters. By analyzing a captured sequence, the embedded information can be recovered.

In one form of the invention, sub-frame generator 108 is configured to combine different kinds of modulation, such as spectro-temporal modulation (e.g., product of spectral and temporal waves), spatio-temporal modulation (e.g., product of spatial and temporal waves), and spatio-spectro-temporal (e.g., product of spatial, spectral, and temporal waves). Such modulations are produced in one form of the invention by multiplying a sine or cosine wave in the temporal dimension with a sine or cosine wave in one or more other dimensions (e.g., spatial dimension or spectral dimension). For example, in one embodiment, sub-frame generator 108 is configured to generate modulation values, d, for spatio-temporal modulation of sub-frames 110 based on the following Equation XVII:

$$d = A \cos(2\pi(f_{spatial}/f_{spatial\_sampling})m + \theta_1)\cos(2\pi(f_{temporal}/f_{temporal\_sampling}) + \theta_2)$$  Equation XVII Where:
- d=dither or modulation value;
- A=amplitude;
- $f_{spatial}$=spatial modulation frequency;
- $f_{spatial\_sampling}$=spatial sampling frequency of system 100;
- m=index for identifying sub-frames;
- $\theta_1$=phase of spatial modulation;
- $f_{temporal}$=temporal modulation frequency;
- $f_{temporal\_sampling}$=temporal sampling or display frequency (i.e., effective frame rate) of system 100; and
- $\theta_2$=phase of temporal modulation.

An advantage of performing spatio-temporal modulation according to one form of the invention is that very low temporal frequencies can be used, and despite the low temporal frequencies, the pattern introduced into the projected images due to the modulation will still not be visible to the human visual system, but will be visible in the camcorder images.

The modulation techniques described above are based on sinusoidal standing wave modulation. In another form of the invention, system 100 is configured to use sinusoidal traveling wave modulation. The human visual system sensitivity to traveling waves at low to mid frequencies is two times that of the sensitivity to standing waves. Thus, if there is a low frequency alias in the camcorder images, a human is more likely to see the alias if it was a traveling wave rather than a standing wave. In one embodiment, sub-frame generator 108 is configured to generate modulation values, d, for traveling wave modulation based on the following Equation XVIII:

$$d = A \cos(2\pi(f_{spatial}/f_{spatial\_sampling})m - v(n/f_{temporal\_sampling}))$$  Equation XVIII Where:
- d=dither or modulation value;
- A=amplitude;
- $f_{spatial}$=spatial modulation frequency;
- $f_{spatial\_sampling}$=spatial sampling frequency of system 100;
- m=index for identifying sub-frames;
- v=velocity of the traveling wave;
- n=index for identifying sub-frames; and
- $f_{temporal\_sampling}$=temporal sampling or display frequency (i.e., effective frame rate) of system 100.

In one embodiment, the velocity, v, of the traveling wave is $f_{temporal}/f_{spatial}$, where $f_{temporal}$ is the temporal modulation frequency.

Figure 7:
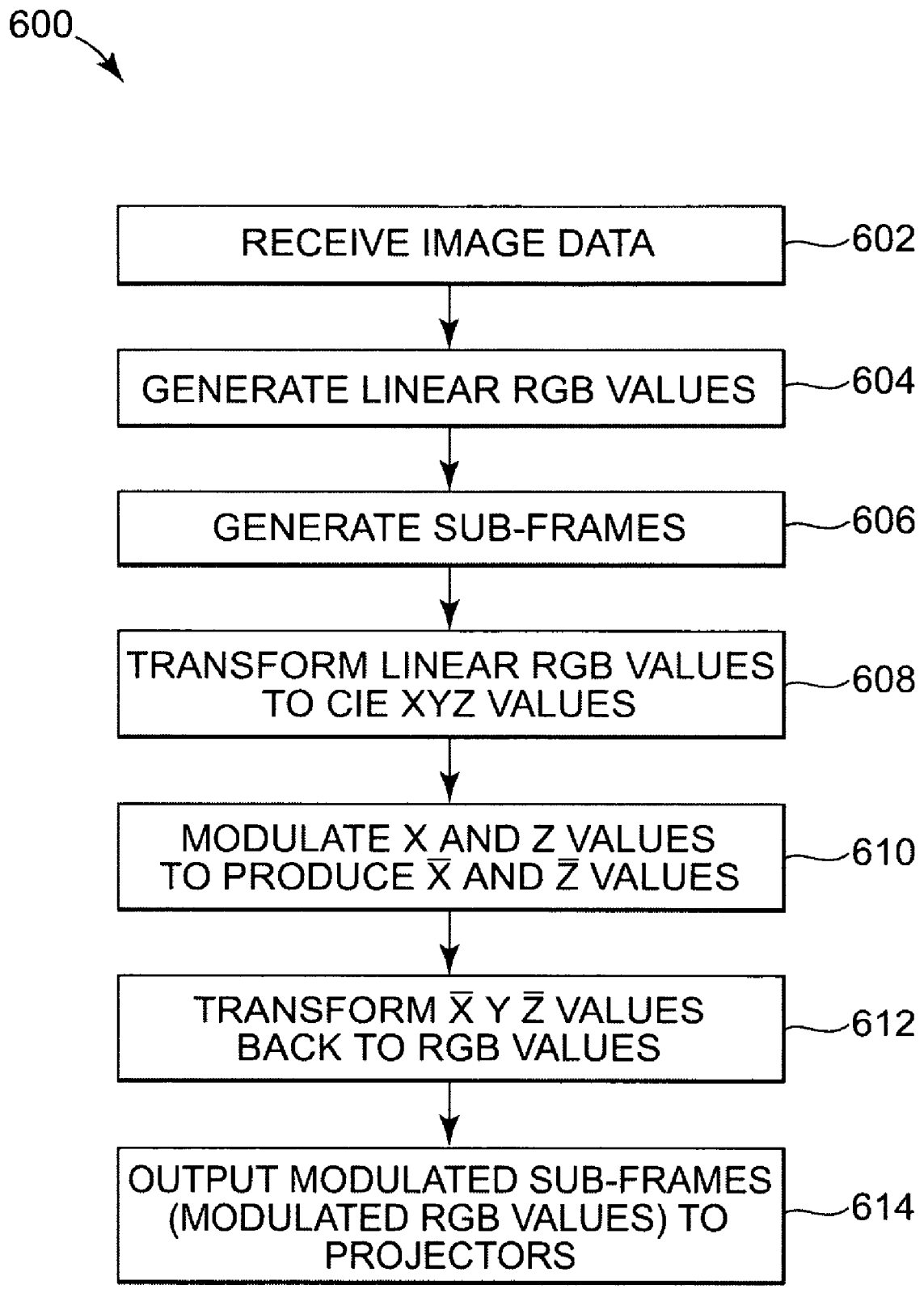
FIG. 7 is a flow diagram illustrating a method for generating modulated or dithered sub-frames according to one embodiment of the present invention.

FIG. 7 is a flow diagram illustrating a method 600 for generating modulated or dithered sub-frames according to one embodiment of the present invention. In one embodiment, sub-frame generator 108 (FIG. 1) is configured to perform method 600. At 602, sub-frame generator 108 receives image data 102. In one embodiment, the image data received at 602 is in an RGB (red-green-blue) format. In another embodiment, the image data received at 602 is in a format other than RGB. At 604, sub-frame generator 108 generates linear RGB values based on the image data received at 602. In one form of the invention, sub-frame generator 108 applies a gamma function to the image data received at 602 to generate the linear RGB values. At 606, sub-frame generator 108 generates sub-frames 110 based on the linear RGB values using Equation X above. At 608, sub-frame generator 108 transforms the linear RGB values of the sub-frames into CIE XYZ values using a conventional transformation technique. In another embodiment, a color space other than the CIE XYZ system is used. In the CIE XYZ system, Y gives luminance information, and X and Z give chrominance information. In one form of the invention, a 3×3 transformation matrix, T, is applied on a pixel-by-pixel basis to generate the CIE XYZ values at 608.

At 610, sub-frame generator 108 modulates the X and Z values (producing $\overline{X}$ and $\overline{Z}$ values) of the sub-frames 110 based on Equations XIV and XV above, and holds the Y values constant (i.e., does not modulate or modify the Y values), thereby modulating the chrominance of the sub-frames 110. At 612, sub-frame generator 108 transforms the $\overline{X}$ Y $\overline{Z}$ values back to modulated RGB values using a conventional transformation technique. In one embodiment, the inverse of the transformation matrix, T, used at 608 is applied to the $\overline{X}$ Y $\overline{Z}$ values at 612 to generate the modulated RGB values. At 614, sub-frame generator 108 outputs the modulated sub-frames 110 to projectors 112 for projection onto surface 116.

One embodiment of the present invention provides an image display system 100 with multiple overlapped low-frame rate projectors 112 that are operated in a temporally offset or staggered manner to achieve a higher frame rate or temporal super-resolution. The low frame rate of the projectors 112 allows computationally intensive graphics and video processing algorithms to run in real-time, which provides an advantage over existing projection systems that have severe frame rate constraints for computer graphics and realistic rendering. In one form of the invention, rich graphics and realistic rendering are provided by system 100 without compromising the effective frame rate or temporal resolution of the system 100. The ability for system 100 to use computationally intensive graphics and video processing algorithms and still provide real time frame rates is particularly useful for gaming applications. Another form of the present invention combines temporally offset projection by a plurality of projectors 112, and dithering or modulation of sub-frames 110 to help prevent or limit illegal camcorder recordings.

Ones form of the present invention provides an image display system 100 with multiple, overlapped low-resolution projectors 112 coupled with an efficient real-time (e.g., video rates) image processing algorithm for generating sub-frames 110. In one embodiment, multiple low-resolution, low-cost projectors 112 are used to produce high resolution images 114 at high lumen levels, but at lower cost than existing high-resolution projection systems, such as a single, high-resolution, high-output projector. One form of the present invention provides a scalable image display system 100 that can provide virtually any desired resolution and brightness by adding any desired number of component projectors 112 to the system 100.

In some existing display systems, multiple low-resolution images are displayed with temporal and sub-pixel spatial offsets to enhance resolution. There are some important differences between these existing systems and embodiments of the present invention. For example, unlike some existing systems where all of the sub-frames go through the same optics and the shifts between sub-frames are all simple translational shifts, in one form of the present invention, the sub-frames 110 are projected through the different optics of the multiple individual projectors 112. In one form of the invention, the signal processing model that is used to generate optimal sub-frames 110 takes into account relative geometric distortion among the component sub-frames 110, and is robust to minor calibration errors and noise.

It can be difficult to accurately align projectors into a desired configuration. In one embodiment of the invention, regardless of what the particular projector configuration is, even if it is not an optimal alignment, sub-frame generator 108 determines and generates optimal sub-frames 110 for that particular configuration.

Algorithms that seek to enhance resolution by offsetting multiple projection elements have been previously proposed. These methods assume simple shift offsets between projectors, use frequency domain analyses, and rely on heuristic methods to compute component sub-frames. In contrast, one form of the present invention utilizes an optimal real-time sub-frame generation algorithm that explicitly accounts for arbitrary relative geometric distortion (not limited to homographies) between the component-projectors 112, including distortions that occur due to a target surface 116 that is non-planar or has surface non-uniformities. One form of the present invention generates sub-frames 110 based on a geometric relationship between a hypothetical high-resolution reference projector 118 at any arbitrary location and each of the actual low-resolution projectors 112, which may also be positioned at any arbitrary location.

In one embodiment, image display system 100 is configured to project images 114 that have a three-dimensional (3D) appearance. In 3D image display systems, two images, each with a different polarization, are simultaneously projected by two different projectors. One image corresponds to the left eye, and the other image corresponds to the right eye. Conventional 3D image display systems typically suffer from a lack of brightness. In contrast, with one embodiment of the present invention, a first plurality of the projectors 112 may be used to produce any desired brightness for the first image (e.g., left eye image), and a second plurality of the projectors 112 may be used to produce any desired brightness for the second image (e.g., right eye image). In another embodiment, image display system 100 may be combined or used with other display systems or display techniques, such as tiled displays. For example, for a displayed image 114 with a plurality of tiles, each tile in the displayed image 114 could be produced by a different plurality of overlapping projectors 112, such as a first set of three projectors 112 for producing overlapping sub-frames for a first tile, a second set of three projectors 112 for producing overlapping sub-frames for a second tile, and so on.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of displaying images with a display system, the method comprising:
    receiving image data for the images;
    generating at least a first sub-frame and at least a second sub-frame corresponding to the image data;
    projecting the first sub-frame with a first projector onto a target surface; and
    projecting the second sub-frame with a second projector onto the target surface at a temporal offset from the projection of the first sub-frame, wherein the first and second projectors are positioned to project sub-frames that spatially overlap on the target surface.

2. The method of claim 1, wherein the first and the second sub-frames are projected with a temporal overlap.

3. The method of claim 1, and further comprising:
    generating a third sub-frame corresponding to the image data; and
    projecting the third sub-frame with a third projector onto the target surface at a temporal offset from the projection of the first and the second sub-frames, wherein the first, second, and third projectors are positioned to project sub-frames that spatially overlap on the target surface.

4. The method of claim 3, and further comprising:
    generating a fourth sub-frame corresponding to the image data; and
    projecting the fourth sub-frame with a fourth projector onto the target surface at a temporal offset from the projection of the first, second, and third sub-frames, wherein the first, second, third, and fourth projectors are positioned to project sub-frames that spatially overlap on the target surface.

5. The method of claim 1, wherein the at least a first sub-frame includes a first plurality of sub-frames and the at least a second sub-frame includes a second plurality of sub-frames, the method further comprising:
    sequentially projecting the first plurality of sub-frames with the first projector onto the target surface at a first frame rate; and
    sequentially projecting the second plurality of sub-frames with the second projector onto the target surface at the first frame rate and temporally interleaved and offset from the first plurality of sub-frames, thereby providing an effective frame rate for the display system of two times the first frame rate.

6. The method of claim 5, wherein there is a delay period between successively projected sub-frames, and wherein the method further comprises:
    automatically varying the delay period over time.

7. The method of claim 1, wherein the first sub-frame and the second sub-frame are generated based on a geometric relationship between a hypothetical reference projector and each of the first and the second projectors.

8. The method of claim 1, wherein the first and the second sub-frames are generated by geometrically transforming and down-sampling the image data.

9. The method of claim 1, wherein the first and the second sub-frames are generated based on maximization of a probability that a simulated image is the same as the image data.

10. The method of claim 1, and further comprising:
    modulating over time an image characteristic of generated sub-frames.

11. The method of claim 10, wherein the image characteristic is chrominance, and wherein luminance values of the sub-frames are not modulated.

12. The method of claim 10, wherein the generated sub-frames are in a red-green-blue (RGB) format, and wherein the method further comprises:
    transforming RGB values of the generated sub-frames into CIE XYZ values;
    modulating over time the X and Z values, thereby generating modulated $\overline{X}$ and $\overline{Z}$ values; and
    transforming the $\overline{X}$ Y $\overline{Z}$ values into modulated RGB values for projection.

13. The method of claim 10, wherein the modulation is a sinusoidal modulation.

14. The method of claim 13, wherein modulation values for the modulation are generated based on the equation, d=A $\sin(2\pi(f_{mod}/f_{disp})n+\theta)$; where: d=modulation value; A=amplitude; $f_{mod}$=modulation frequency; $f_{disp}$=effective frame rate of the display system; n=index for identifying sub-frames; and $\theta$=phase.

15. The method of claim 14, wherein the modulation frequency, $f_{mod}$, is greater than about 30 Hz.

16. The method of claim 14, wherein the modulation frequency, $f_{mod}$, is between about 27-30 Hz.

17. The method of claim 14, wherein the modulation frequency, $f_{mod}$, satisfies the equation, $f_{mod}=(m/n)f_{samp}$; where: $f_{mod}$=modulation frequency; m and n=relatively prime numbers, and $(m/n) \leq (1/2)$; and $f_{samp}$=sampling frequency.

18. The method of claim 17, wherein the sampling frequency, $f_{samp}$, approximately equals 60 Hz, and the modulation frequency, $f_{mod}$, is less than 30 Hz.

19. The method of claim 14, wherein the modulation includes automatically varying the phase, $\theta$.

20. The method of claim 10, wherein the modulation is based on a product of sine waves.

21. The method of claim 10, wherein the modulation is a traveling wave modulation.

22. The method of claim 10, wherein an amplitude of the modulation is varied based on a current value of the image characteristic.

23. A system for displaying images, the system comprising:
    a buffer adapted to receive image data for the images;
    a sub-frame generator configured to define first and second pluralities of sub-frames corresponding to the image data;
    a first projection device adapted to sequentially project the first plurality of sub-frames onto a target surface; and
    a second projection device adapted to sequentially project the second plurality of sub-frames onto the target surface temporally offset from and temporally interleaved with the projection of the first plurality of sub-frames, wherein the first and second projection devices are positioned to project sub-frames that spatially overlap on the target surface.

24. The system of claim 23, wherein the first projection device is configured to project the first plurality of sub-frames onto the target surface at a first frame rate, and the second projection device is configured to project the second plurality of sub-frames onto the target surface at the first frame rate, thereby providing an effective frame rate for the display system of two times the first frame rate.

25. The system of claim 23, wherein the sub-frame generator is configured to modulate over time an image characteristic of generated sub-frames.

26. The system of claim 25, wherein the sub-frame generator is configured to generate modulation values for the modulation based on the equation, $d=A \sin(2\pi(f_{mod}/f_{disp})n+\theta)$; where: d=modulation value; A=amplitude; $f_{mod}$=modulation frequency; $f_{disp}$=effective frame rate of the system for displaying images; n=index for identifying sub-frames; and $\theta$=phase.

27. A system for projecting low-resolution sub-frames onto a viewing surface, comprising:
    means for receiving high-resolution images;
    means for generating a first and a second plurality of low-resolution sub-frames based on the high-resolution images;
    first means for projecting the first plurality of sub-frames; and
    second means for projecting the second plurality of sub-frames at temporal and spatial offsets from the projection of the first plurality of sub-frames, thereby generating the appearance of high-resolution images.

28. The system of claim 27, and further comprising means for performing a sinusoidal modulation of an image characteristic of generated sub-frames.

29. A computer-readable medium having computer-executable instructions for performing a method of generating low-resolution sub-frames for projection onto a viewing surface to give the appearance of high-resolution images, the method comprising:
    receiving high-resolution images;
    generating a plurality of low-resolution sub-frames based on the high-resolution images, wherein the low-resolution sub-frames are configured to be projected by a plurality of projectors in a temporally offset, temporally interleaved, and spatially overlapping manner; and
    performing a sinusoidal modulation of an image characteristic of the generated sub-frames.

* * * * *

UNITED STATES PATENT AND TRADEMARK OFFICE
CERTIFICATE OF CORRECTION

PATENT NO. : 7,470,032 B2  Page 1 of 1
APPLICATION NO. : 11/260737
DATED : December 30, 2008
INVENTOR(S) : Niranjan Damera-Venkata et al.

It is certified that error appears in the above-identified patent and that said Letters Patent is hereby corrected as shown below:

In column 5, line 6, delete "100B-1" and insert -- 110B-1 --, therefor.

In column 13, line 20, delete "100B-3 and 100B-4" and insert -- 110B-3 and 110B-4 --, therefor.

In column 13, line 27, delete "100B-3" and insert -- 110B-3 --, therefor.

In column 15, line 53, delete "T1" and insert -- T10 --, therefor.

In column 22, line 44, delete "Ones" and insert -- One --, therefor.

Signed and Sealed this

Fourteenth Day of July, 2009

JOHN DOLL
*Acting Director of the United States Patent and Trademark Office*